(12) United States Patent
Keefer et al.

(10) Patent No.: US 6,451,095 B1
(45) Date of Patent: Sep. 17, 2002

(54) MODULAR PRESSURE SWING ADSORPTION APPARATUS

(75) Inventors: Bowie Gordon Keefer, Vancouver; David G. Doman, Delta; Christopher R. McLean, Vancouver, all of (CA)

(73) Assignee: QuestAir Technologies, Inc., Burnaby BC (CA)

( * ) Notice: Subject to any disclaimer, the term of this patent is extended or adjusted under 35 U.S.C. 154(b) by 0 days.

(21) Appl. No.: 09/584,269

(22) Filed: Sep. 18, 2000

Related U.S. Application Data

(63) Continuation of application No. PCT/CA98/01103, filed on Dec. 1, 1998.
(60) Provisional application No. 60/067,120, filed on Dec. 1, 1997.

(51) Int. Cl.[7] .............................................. B01D 53/06
(52) U.S. Cl. ............................ 96/125; 96/130; 96/144; 96/150
(58) Field of Search ............................ 95/96–106, 113, 95/130, 138; 96/115, 124, 125, 130, 144, 150

(56) References Cited

U.S. PATENT DOCUMENTS

| | | | | |
|---|---|---|---|---|
| 1,602,500 A | * | 10/1926 | Nuss | 96/125 |
| 2,053,159 A | * | 9/1936 | Miller | 96/125 |
| 2,286,920 A | * | 6/1942 | Miller | 96/125 |
| 2,541,694 A | * | 2/1951 | Galson | 96/125 |
| 2,639,000 A | * | 5/1953 | Edwards | 96/125 |
| 3,176,446 A | * | 4/1965 | Siggelin | 96/125 |
| 3,252,273 A | * | 5/1966 | Stephens | 96/125 |
| 4,452,612 A | | 6/1984 | Mattia | 55/25 |
| 4,589,892 A | * | 5/1986 | Leonard | 96/125 X |
| 4,702,903 A | * | 10/1987 | Keefer | 423/359 |
| 4,732,579 A | * | 3/1988 | Veltman et al. | 96/130 X |
| 4,758,253 A | * | 7/1988 | Davidson et al. | 55/77 |
| 4,863,497 A | * | 9/1989 | Grenier et al. | 96/125 X |
| 5,017,202 A | * | 5/1991 | Ogata et al. | 96/125 |
| 5,057,128 A | | 10/1991 | Paxrzica et al. | 55/181 |
| 5,133,784 A | | 7/1992 | Boudet et al. | 55/25 |
| 5,238,052 A | * | 8/1993 | Chagnot | 96/125 X |
| 5,246,676 A | * | 9/1993 | Hay | 423/219 |
| 5,256,172 A | * | 10/1993 | Keefer | 96/125 X |
| 5,393,326 A | * | 2/1995 | Engler et al. | 95/103 |
| 5,431,716 A | * | 7/1995 | Ebbeson | 96/125 |
| 5,441,559 A | * | 8/1995 | Petit et al. | 96/125 |
| 5,912,426 A | * | 6/1999 | Smolarek et al. | 96/130 X |
| 5,942,203 A | * | 8/1999 | Van Dijk et al. | 95/130 X |
| 6,051,050 A | * | 4/2000 | Keefer et al. | 96/125 X |
| 6,056,804 A | * | 5/2000 | Keefer et al. | 96/125 X |

FOREIGN PATENT DOCUMENTS

| | | | |
|---|---|---|---|
| JP | 56150418 | 11/1981 | |
| WO | A 9320925 | 10/1993 | |
| WO | WO 94/04249 | 3/1994 | B01D/53/04 |

* cited by examiner

*Primary Examiner*—Robert H. Spitzer
(74) *Attorney, Agent, or Firm*—Klarquist Sparkmanl, LLP

(57) ABSTRACT

A rotary module for implementing a high frequency pressure swing adsorption process comprises a stator and a rotor rotatably coupled to the stator. The stator includes a first stator valve surface, a second stator valve surface, a plurality of first function compartments opening into the first stator valve surface, and a plurality of second function compartments opening into the second stator valve surface. The rotor includes a first rotor valve surface in communication with the first stator valve surface, a second rotor valve surface in communication with the second stator valve surface, and a plurality of flow paths for receiving adsorbent material therein. Each flow path includes a pair of opposite ends, and a plurality of apertures provided in the rotor valve surfaces and in communication with the flow path ends and the function ports for cyclically exposing each said flow path to a plurality of discrete pressure levels between the upper and lower pressures for maintaining uniform gas flow through the first and second function compartments.

17 Claims, 29 Drawing Sheets

MODULAR PRESSURE SWING ADSORPTION APPARATUS

This application is a continuation of PCT/CA98/01103 filed Dec. 1, 1998 (designating the United States), which claims priority to Ser. No. 60/067,120, filed Dec. 1, 1997.

FIELD OF THE INVENTION

The present invention relates to an apparatus for separating gas fractions from a gas mixture having multiple gas fractions. In particular, the present invention relates to a rotary valve gas separation system having a plurality of rotating adsorbent beds disposed therein for implementing a pressure swing adsorption process for separating out the gas fractions.

BACKGROUND OF THE INVENTION

Pressure swing adsorption (PSA) and vacuum pressure swing adsorption (VPSA) separate gas fractions from a gas mixture by coordinating pressure cycling and flow reversals over an adsorbent bed which preferentially adsorbs a more readily adsorbed component relative to a less readily adsorbed component of the mixture. The total pressure of the gas mixture in the adsorbent bed is elevated while the gas mixture is flowing through the adsorbent bed from a first end to a second end thereof, and is reduced while the gas mixture is flowing through the adsorbent from the second end back to the first end. As the PSA or VPSA cycle is repeated, the less readily adsorbed component is concentrated adjacent the second end of the adsorbent bed, while the more readily adsorbed component is concentrated adjacent the first end of the adsorbent bed. As a result, a "light" product (a gas fraction depleted in the more readily adsorbed component and enriched in the less readily adsorbed component) is delivered from the second end of the bed, and a "heavy" product (a gas fraction enriched in the more strongly adsorbed component) is exhausted from the first end of the bed.

The conventional system for implementing pressure swing adsorption or vacuum pressure swing adsorption uses two or more stationary adsorbent beds in parallel, with directional valving at each end of each adsorbent bed to connect the beds in alternating sequence to pressure sources and sinks. However, this system is often difficult and expensive to implement due to the complexity of the valving required.

Furthermore, the conventional PSA or VPSA system makes inefficient use of applied energy, because feed gas pressurization is provided by a compressor whose delivery pressure is the highest pressure of the cycle. In PSA, energy expended in compressing the feed gas used for pressurization is then dissipated in throttling over valves over the instantaneous pressure difference between the absorber and the high pressure supply. Similarly, in VPSA, where the lower pressure of the cycle is established by a vacuum pump exhausting gas at that pressure, energy is dissipated in throttling over valves during countercurrent blowdown of adsorbers whose pressure is being reduced. A further energy dissipation in both systems occurs in throttling of light reflux gas used for purge. equalization. cocurrent blowdown and product pressurization or backfill steps.

Numerous attempts have been made at overcoming the deficiencies associated with the conventional PSA or VPSA system. For example, Siggelin (U.S. Pat. No. 3,176,446). Mattia (U.S. Pat. No. 4,452,612). Davidson and Lywood (U.S. Pat. No. 4,758,253), Boudet et al (U.S. Pat. No. 5,133,784), Petit et al (U.S. Pat. No. 5,441,559) and Schartz (PCT publication WO 94/04249) disclose PSA devices using rotary distributor valves having rotors fitted with multiple angularly separated adsorbent beds. Ports communicating with the rotor-mounted adsorbent beds sweep past fixed ports for feed admission, product delivery and pressure equalization. However, these prior art rotary distributor valves are impracticable for large PSA/VPSA units, owing to the weight of the rotating assembly. Furthermore, since the valve faces are remote from the ends of the adsorbent beds, these rotary distributor valves have considerable dead volume for flow distribution and collection. As a result, the prior art rotary distributor valves have poor flow distribution, particularly at high cycle frequencies.

Hay (U.S. Pat. No. 5,246,676) and Engler (U.S. Pat. No. 5,393,326) provide examples of vacuum pressure swing adsorption systems which reduce throttling losses in an attempt to improve the efficiency of the gas separation process system. The systems taught by Hay and Engler use a plurality of vacuum pumps to pump down the pressure of each adsorbent bed sequentially in turn, with the pumps operating at successively lower pressures, so that each vacuum pump reduces the pressure in each bed a predetermined amount. However, with these systems, the vacuum pumps are subjected to large pressure variations, stressing the compression machinery and causing large fluctuations in overall power demand. Because centrifugal or axial compression machinery cannot operate under such unsteady conditions, rotary lobe machines are typically used in such systems. However, such machines have lower efficiency than modern centrifugal compressors/vacuum pumps working under steady conditions.

Accordingly, there remains a need for a PSA/VPSA system which is suitable for high volume and high frequency production, while reducing the losses associated with the prior art devices.

SUMMARY OF THE INVENTION

It is an object of the present invention to provide a rotary module for implementing a high frequency pressure swing adsorption process with high energy efficiency.

The rotary module, in accordance with the invention, comprises a stator and a rotor rotatably coupled to the stator. The stator includes a first stator valve surface, a second stator valve surface, a plurality of first function compartments opening into the first stator valve surface, and a plurality of second function compartments opening into the second stator valve surface. The rotor includes a first rotor valve surface in communication with the first stator valve surface, a second rotor valve surface in communication with the second stator valve surface, and a plurality of flow paths for receiving adsorbent material therein. Each said flow path includes a pair of opposite ends. and a plurality of apertures provided in the rotor valve surfaces and in communication with the flow path ends and the function ports for cyclically exposing each said flow path to a plurality of discrete pressure levels between the upper and lower pressures for maintaining uniform gas flow through the first and second function compartments.

During pressurization and blowdown steps, the several adsorbers passing through the step will converge to the nominal pressure level of each step by a throttling pressure equalization from the pressure level of the previous step experienced by the adsorbers. Flow is provided to the adsorbers in a pressurization step or withdrawn in a blowdown step by compression machinery at the nominal pressure level of that step. Hence flow and pressure pulsations seen by the compression machinery at each intermediate pressure level are minimal by averaging from the several adsorbers passing through the step, although each absorber undergoes large cyclic changes of pressure and flow.

During the pressurization steps for each adsorber, either (or both) of the apertures of an adsorber already at a pressure is (are) opened respectively to a first or second pressurization compartment at a stepwise higher pressure. Similarly, during the pressurization steps for each adsorber, either (or both) of the apertures of an adsorber already at a pressure is (are) opened respectively to a first or second pressurization compartment at a stepwise lower pressure. Equalization then takes place by flow through the open aperture(s) from the pressurization/blowdown compartment into the adsorber, which by the end of the pressurization/blowdown step has attained approximately the same pressure as the pressurization/blowdown compartment(s). Each pressurization/blowdown compartment is in communication with typically several adsorbers being pressurized (in differing angular and time phase) at any given time, so the pressure in that compartment and the pressurization flow to that compartment are substantially steady.

The flow path through the adsorbers may be radial or axial. If the adsorbers are configured for radial flow, the first valve surface would preferably be radially inward when the less strongly adsorbed gas fraction has much higher density that the more strongly adsorbed fraction, and the first valve surface would preferably be radially outward when the less strongly adsorbed gas fraction has much lower density than the more strongly adsorbed fraction. Hence, for hydrogen purification in a radial flow embodiment, the feed gas would preferably be admitted to (and the higher molecular weight impurity fraction as heavy product is exhausted from) the first valve surface at an outer radius, while the hydrogen as first product gas is delivered from the second valve surface.

The present invention also includes the alternatives of (1) layered or laminated thin sheet adsorbers and (2) the centrifugally stabilized fine particle granular adsorbers to enable operation at exceptionally high cycle frequency. PSA cycle frequencies to at least 100 cycles per minute are practicable within the present invention, and will enable process intensification so that high productivity can be realized from compact modules. Cycle frequencies more rapid than about 50 cycles per minute will be achieved preferably with the layered thin sheet adsorbers, with the flow path in flow channels tangential to and between adjacent pairs of adsorbent loaded sheets, to obtain lower frictional pressure drop at high frequency than granular adsorbent.

Preferably, the increments between adjacent pressure levels are sized so that the gas flows entering or exiting the module are substantially steady in both flow velocity and pressure. As a result, the module can be operated with centrifugal or axial flow compressors and expanders. for most favourable efficiency and capital cost economies of scale. To reduce throttling losses, it is also preferred that the function compartments are shaped to provide uniform gas flow through the flow paths and/or the valve surfaces include sealing strips having tapered portions for providing uniform gas flow through the flow paths.

Since the orifices providing the valving function are immediately adjacent to the ends of the flow paths, the dead volume associated with prior art distribution manifolds is substantially reduced. Also, since the compartments communicating with the first and second valve surfaces are external to the valving function, the compartments do not contribute to dead volume of the adsorbers. As a result, high frequency pressure/vacuum swing adsorption is possible.

Also, in contrast to prior art PSA devices whose pressure vessels are subject to pressure cycling and consequent fatigue loading, the pressure vessel of the present invention operates under substantially static stresses, because each of the compartments operates under steady pressure conditions. Mechanical stresses on the rotor and its bearings are relatively small, because only small frictional pressure drops (at most equal to the interval between adjacent intermediate pressures) apply in the flow direction, while transverse pressure gradients between the adsorber elements are also small owing to the large number of elements. These features are important, since pressure vessel fatigue is a major concern and limitation in the design of PSA systems, especially working with corrosive gases or hydrogen at higher pressure or higher cycle frequency.

Further, by providing multiple closely spaced intermediate pressure levels, with substantially constant flow and pressure at each level, the present invention facilitates energy efficient application of multistage feed compressors and vacuum pumps (including centrifugal or axial compression machines) for feed compression, heavy product exhaust and heavy reflux compression; as well as multistage expanders (including radial inflow turbines, axial turbines and partial admission impulse turbines). Positive displacement (reciprocating piston, rotary piston, or progressive cavity such as screw or scroll machines) compression and expansion machinery may also be applied within the scope of the invention, particularly when adapted to deliver gas at multiple intermediate delivery pressures and/or to intake gas at multiple intermediate inlet pressures. The invention enables use of single shaft machines to provide all compression and expansion functions for a plurality of modules in parallel, as well as the combined use of motor driven and free rotor machines for more flexible modulezation and splitting of stages.

The inventive concept of split stream centrifugal machinery is a desirable option for the described PSA process which requires various enthalpies in separate fluid streams at differing total pressures. The split stream machine has multiple inlet flows at multiple enthalpies, and/or multiple exit flows at multiple enthalpies, for a single centrifugal or radial flow impeller. The differing changes in ecthalpy or total pressure are achieved by having a different change in radius, or differing blade angles, for each flow across the impeller. A split stream compressor has one inlet but numerous outlets at different total pressures or enthalpy levels from a single impeller. A split stream exhauster may be a vacuum pump or an expander, and will have multiple inlets and a single outlet at different total pressures or enthalpy levels for a single impeller. Also useful in the present invention is a split stream light reflux expander having a number of inlets and the same number of outlets, at different total pressures or enthalpy levels for a s ingle impeller.

BRIEF DESCRIPTION OF THE DRAWINGS

The preferred embodiments of the present invention will now be described, by way o f example only, and with reference to the drawings, in which like reference numerals indicate like elements, and in which.

DETAILED DESCRIPTION OF THE PREFERRED EMBODIMENTS

FIGS. 1, 2, 3 and 4

Figure 1:
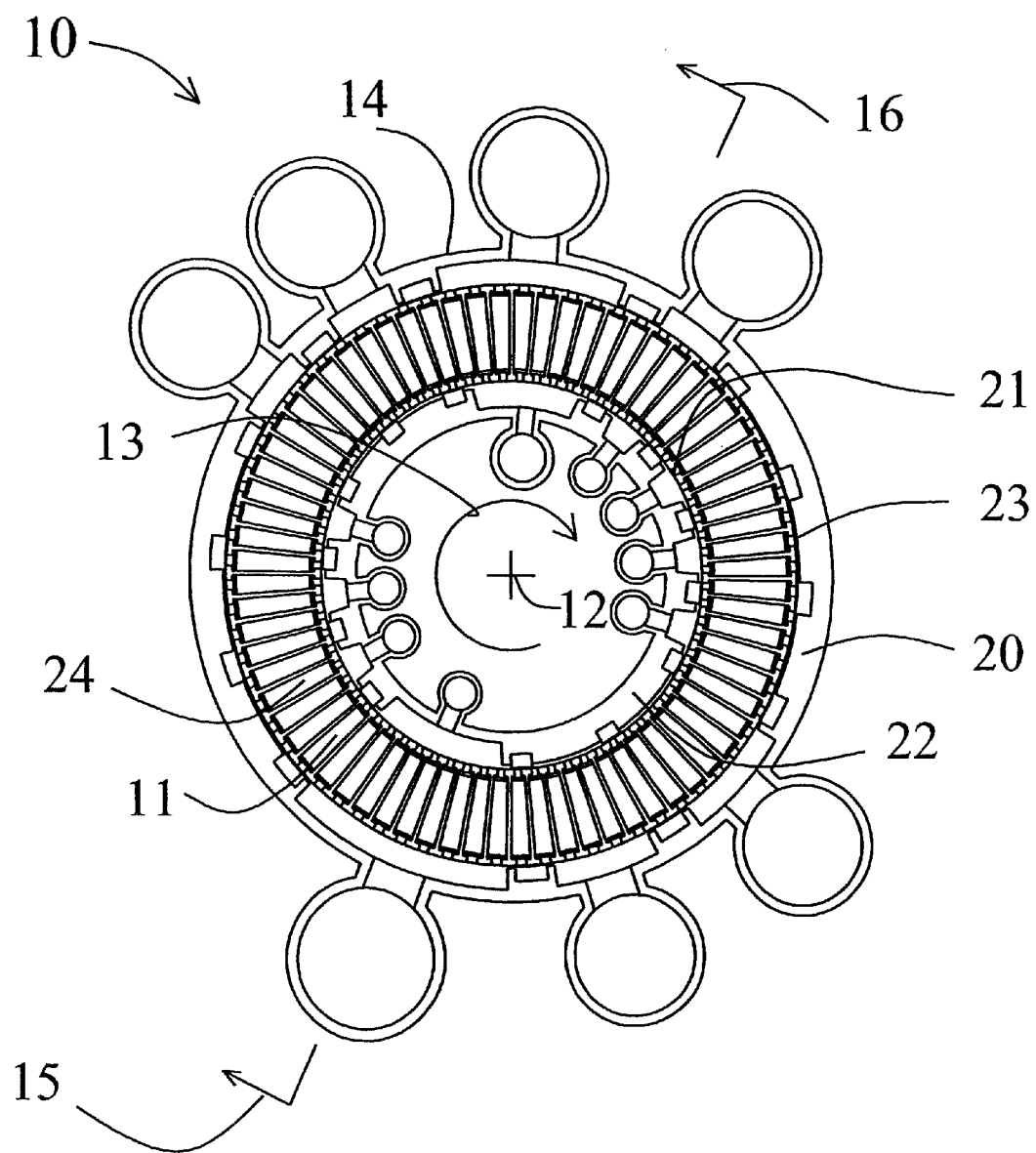
FIG. 1 is a sectional view of a rotary PSA module according to the invention.
Figure 2:
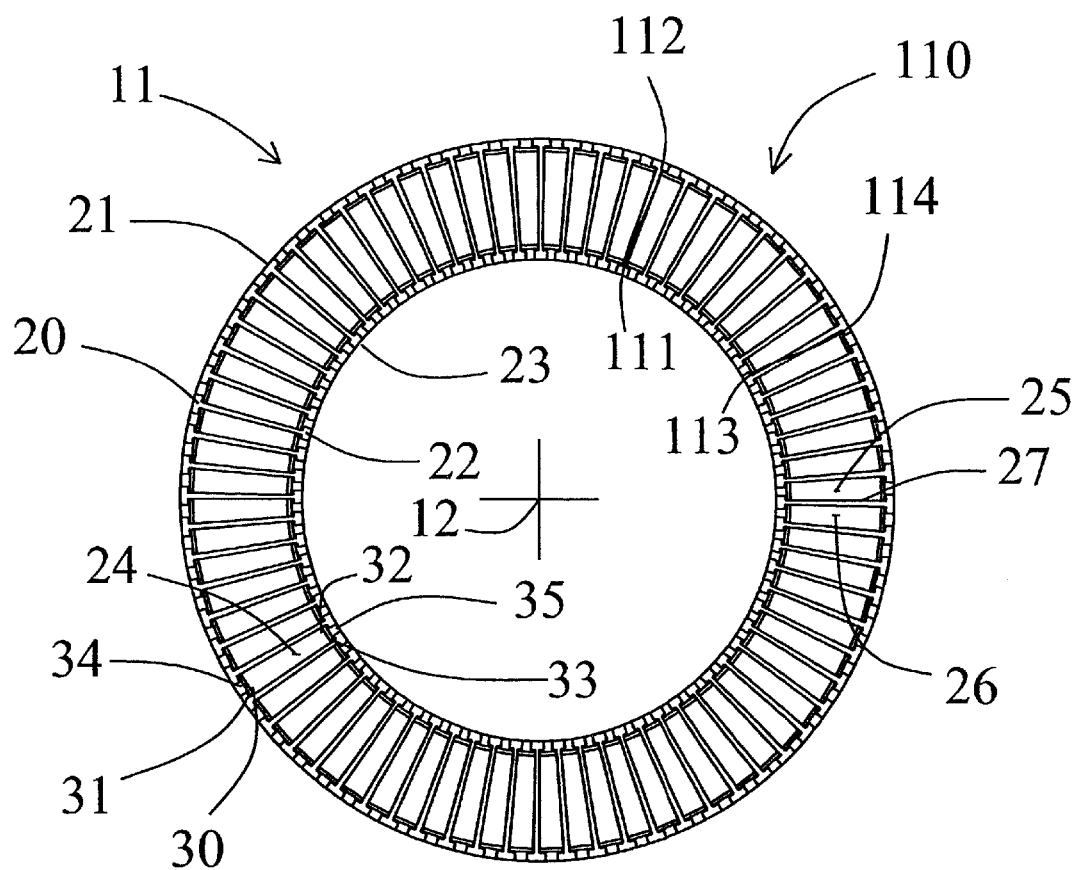
FIG. 2 is the stator of the module of FIG. 1.
Figure 3:
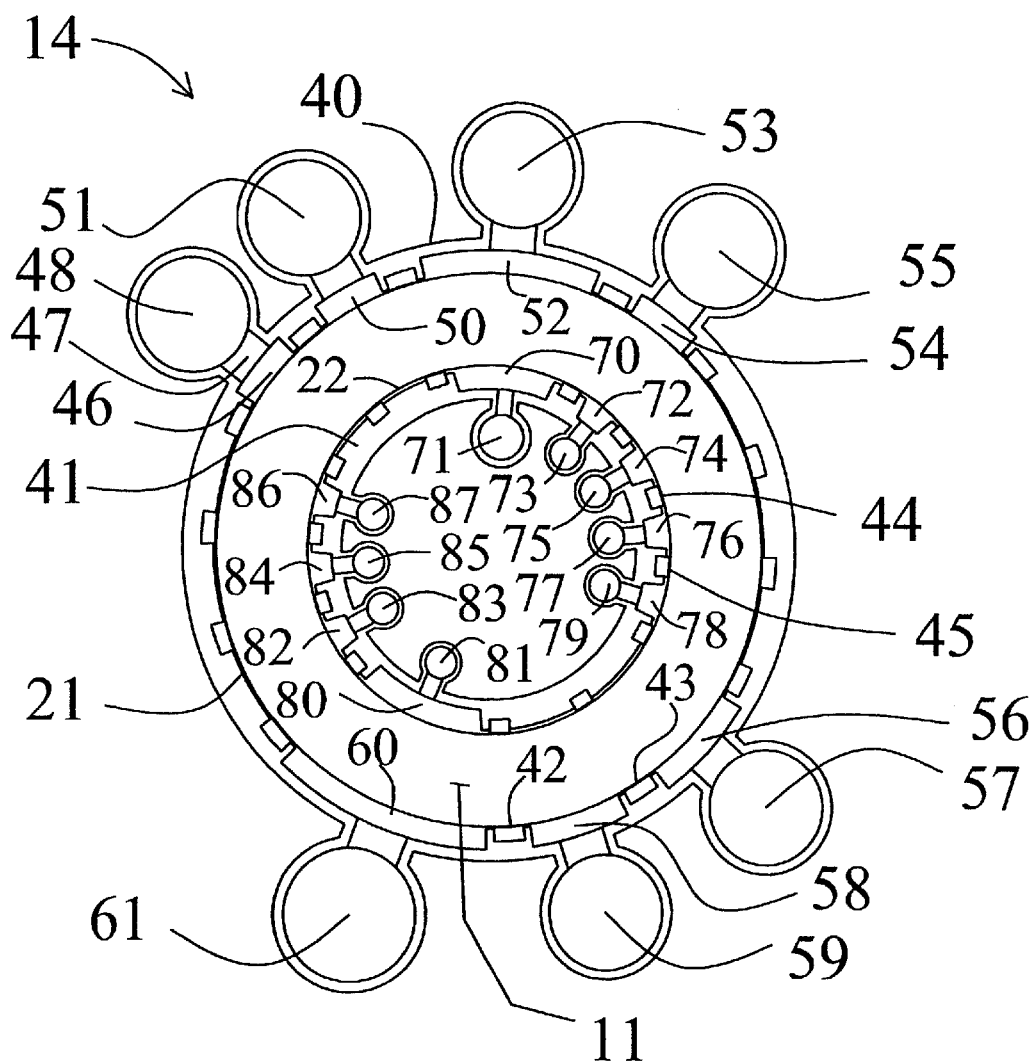
FIG. 3 is the rotor of the module of FIG. 1.
Figure 4:
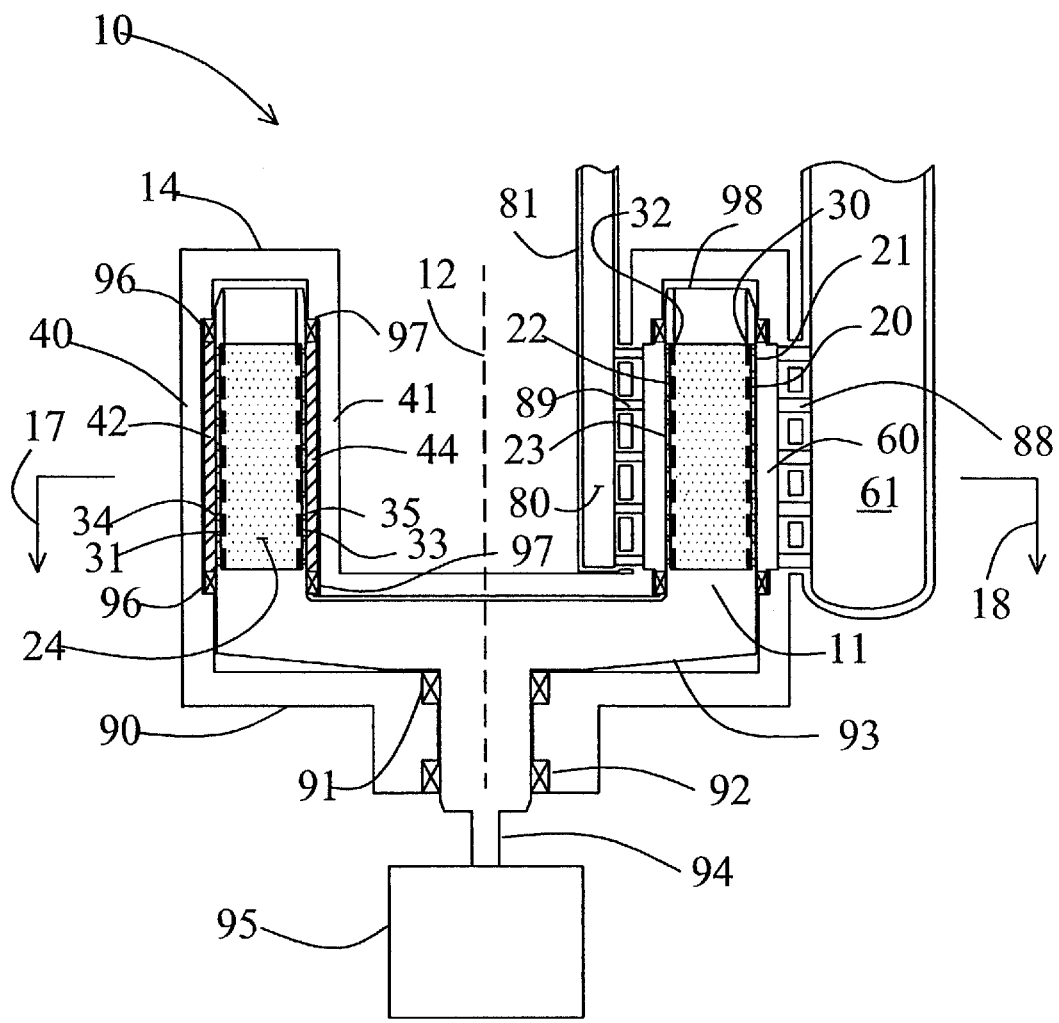
FIG. 4 is an axial section of the module of FIG. 1.

A rotary module 10 according to the invention is shown in FIGS. 1, 2, 3 and 4. The module includes a rotor 11 revolving about axis 12 in the direction shown by arrow 13 within stator 14. FIG. 4 is an axial section of the module 10, defined by arrows 15 and 16 in FIG. 1. FIG. 1 is a cross-section of the module 10, defined by arrows 17 and 18 in FIG. 4. FIG. 2 is the sectional view of the rotor 11 repeated from FIG. 1, with the stator deleted for clarity. FIG. 3 is the sectional view of the stator 14 repeated from FIG. 1, with details of the rotor deleted for clarity.

In general, the apparatus of the invention may be configured for flow through the adsorber elements in the radial, axial or oblique conical directions relative to the rotor axis. For operation at high cycle frequency, radial flow has the advantage that the centripetal acceleration will lie parallel to the flow path for most favourable stabilization of buoyancy-driven free convection, as well as centrifugal clamping of granular adsorbent with uniform flow distribution. As shown in FIG. 2, the rotor 11 is of annular section, having concentrically to axis 12 an outer cylindrical wall 20 whose external surface is first valve surface 21, and an inner cylindrical wall 22 whose internal surface is second valve surface 23. The rotor has (in the plane of the section defined by arrows 15 and 16 in FIG. 4) a total of "N" radial flow adsorber elements 24. An adjacent pair of adsorber elements 25 and 26 are separated by partition 27 which is structurally and sealingly joined to outer wall 20 and inner wall 22. Adjacent adsorber elements 25 and 26 are angularly spaced relative to axis 12 by an angle of [360°/N].

Adsorber element 24 has a first end 30 defined by support screen 31 and a second end 32 defined by support screen 33. The adsorber may be provided as granular adsorbent, whose packing voidage defines a float path contracting the adsorbent between the first and second ends of the adsorber.

First aperture or orifice 34 provides flow communication from first valve surface 21 through wall 20 to the first end 30 of adsorber 24. Second aperture or orifice 35 provides flow communication from second valve surface 23 through wall 22 to the second end 31 of adsorber 24. Support screens 31 and 33 respectively provide flow distribution between first aperture 34 and first end 30, and between second aperture 35 and second end 32, of adsorber element 24. Support screen 31 also supports the centrifugal force loading of the adsorbent.

As shown in FIG. 3, stator 14 is a pressure housing including an outer cylindrical shell or first valve stator 40 outside the annular rotor 11, and an inner cylindrical shell or second valve stator 41 inside the annular rotor 11. Outer shell 40 carries axially extending strip seals (e.g. 42 and 43) sealingly engaged with first valve surface 21, while inner shell 41 carries axially extending strip seals (e.g. 44 and 45) sealingly engaged with second valve surface 23. The azimuthal sealing width of the strip seals is greater than the diameters or azimuthal widths of the first and second apertures 34 and 35 opening through the first and second valve surfaces.

A set of first compartments in the outer shell each open in an angular sector to the first valve surface, and each provide fluid communication between its angular sector of the first valve surface and a manifold external to the module. The angular sectors of the compartments are much wider than the angular separation of the adsorber elements. The first compartments are separated on the first sealing surface by the strip seals (e.g. 42). Proceeding clockwise in FIG. 3, in the direction of rotor rotation, a first feed pressurization compartment 46 communicates by conduit 47 to first feed pressurization manifold 48, which is maintained at a first intermediate feed pressure. Similarly, a second feed pressurization compartment 50 communicates to second feed pressurization manifold 51, which is maintained at a second intermediate feed pressure higher than the first intermediate feed pressure but less than the higher working pressure.

For greater generality, module 10 is shown with provision for sequential admission of two feed mixtures, the first feed gas having a lower concentration of the more readily adsorbed component relative to the second feed gas. First feed compartment 52 communicates to first feed manifold 53, which is maintained at substantially the higher working pressure. Likewise, second feed compartment 54 communicates to second feed manifold 55, which is maintained at substantially the higher working pressure. A first countercurrent blowdown compartment 56 communicates to first countercurrent blowdown manifold 57, which is maintained at a first countercurrent blowdown intermediate pressure. A second countercurrent blowdown compartment 58 communicates to second countercurrent blowdown manifold 59, which is maintained at a second countercurrent blowdown intermediate pressure above the lower working pressure. A heavy product compartment 60 communicates to heavy product exhaust manifold 61 which is maintained at substantially the lower working pressure. It will be noted that compartment 58 is bounded by strip seals 42 and 43, and similarly all the compartments are bounded and mutually isolated by strip seals.

A set of second compartments in the inner shell each open in an angular sector to the second valve surface, and each provide fluid communication between its angular sector of the second valve surface and a manifold external to the module. The second compartments are separated on the second sealing surface by the strip seals (e.g. 44). Proceeding clockwise in FIG. 3, again in the direction of rotor rotation, light product compartment 70 communicates to light product manifold 71, and receives light product gas at substantially the higher working pressure, less frictional pressure drops through the adsorbers and the first and second orifices. According to the angular extension of compartment 70 relative to compartments 52 and 54, the light product may be obtained only from adsorbers simultaneously receiving the first feed gas from compartment 52, or from adsorbers receiving both the first and second feed gases.

A first light reflux exit compartment 72 communicates to first light reflux exit manifold 73, which is maintained at a first light reflux exit pressure, here substantially the higher working pressure less frictional pressure drops. A first cocurrent blowdown compartment 74 (which is actually the second light reflux exit compartment), communicates to second light reflux exit manifold 75, which is maintained at a first cocurrent blowdown pressure less than the higher working pressure. A second cocurrent blowdown compartment or third light reflux exit compartment 76 communicates to third light reflux exit manifold 77, which is maintained at a second cocurrent blowdown pressure less than the first cocurrent blowdown pressure. A third cocurrent blowdown compartment or fourth light reflux exit compartment 78 communicates to fourth light reflux exit manifold 79, which is maintained at a third cocurrent blowdown pressure less than the second cocurrent blowdown pressure.

A purge compartment 80 communicates to a fourth light reflux return manifold 81, which supplies the fourth light reflux gas which has been expanded from the third cocurrent blowdown pressure to substantially the lower working pressure with an allowance for frictional pressure drops. The ordering of light reflux pressurization steps is inverted from the ordering or light reflux exit or cocurrent blowdown steps, so as to maintain a desirable "last out—first in" stratification of light reflux gas packets. Hence a first light reflux pressurization compartment 82 communicates to a third light reflux return manifold 83, which supplies the third light reflux gas which has been expanded from the second cocurrent blowdown pressure to a first light reflux pressurization pressure greater than the lower working pressure. A second light reflux pressurization compartment 84 communicates to a second light reflux return manifold 85, which supplies the second light reflux gas which has been expanded from the first cocurrent blowdown pressure to a second light reflux pressurization pressure greater than the first light reflux pressurization pressure. Finally, a third fight reflux pressurization compartment 86 communicates to a first light reflux return manifold 87, which supplies the first light reflux gas which has been expanded from approximately the higher pressure to a third light reflux pressurization pressure greater than the second light reflux pressurization pressure, and in this example less than the first feed pressurization pressure.

Additional details are shown in FIG. 4. Conduits 88 connect first compartment 60 to manifold 61, with multiple conduits providing for good axial flow distribution in compartment 60. Similarly, conduits 89 connect second compartment 80 to manifold 81. Stator 14 has base 90 with bearings 91 and 92. The annular rotor 11 is supported on end disc 93, whose shaft 94 is supported by bearings 91 and 92. Motor 95 is coupled to shaft 94 to drive rotor 11. The rotor could alternatively rotate as an annular drum, supported by rollers at several angular positions about its rim and also driven at its rim so that no shaft would be required. A rim drive could be provided by a ring gear attached to the rotor, or by a linear electromagnetic motor whose stator would engage an arc of the rim. Outer circumferential seals 96 seal the ends of outer strip seals 42 and the edges of first valve surface 21, while inner circumferential seals 97 seal the ends of inner strip seals 44 and the edges of second valve surface 23. Rotor 11 has access plug 98 between outer wall 20 and inner wall 22, which provides access for installation and removal of the adsorbent in adsorbers 24.

A further most important benefit of the invention in radial flow embodiments arises in purification of very low molecular weight gases such as hydrogen and helium to remove higher molecular weight impurities. Here, the light product is separated radially inward, while the heavy impurities are separated radially outward by the centrifugal PSA apparatus of the present invention. In all PSA systems, dispersive effects including axial dispersion. uneven bed packing, thermal gradients and wall flow channeling all tend to spread the concentration gradient in the bed so as to degrade separation performance. But the strong centripetal acceleration field of the present invention will induce a buoyant stratification of the purified light fraction radially inward of the separated heavy fraction, thus opposing dispersive effects and enhancing separation performance. This important desirable effect is present whether granular adsorbent or laminated sheet supported adsorbent is used, as long as the flow direction in the adsorbent bed is radially inward from the first end to the second end of the bed.

In air separation with the feed presented to the outer radius of the adsorbers, the buoyancy effect due to the greater molecular weight of oxygen compared to nitrogen would be modestly adverse. The molecular weight difference between hydrogen and its impurities (other than helium) is far greater and in the desired direction. Some process embodiments of the present invention include the feature of heating the oxygen light reflux gas, for the main objects of thermally enhancing expansion energy recovery, improving adsorption/desorption kinetics, and shifting the optimal operating pressure range from vacuum to positive superatmospheric pressure conditions. Heating the light reflux oxygen sufficiently will create a radial thermal gradient, so that the second end of the adsorbers (at an inner radius) will be hotter than the first end of the adsorbers (at an outer radius). In a rapidly rotating rotor of the invention, this thermal gradient will enhance the convective stability of the mass transfer front in the adsorbers, and will tend to compensate the adverse effect of oxygen being more dense than nitrogen at equal temperature. The present invention thus can provide radial stabilization of the mass transfer front by establishing a radial density gradient either of lower molecular weight of the gas contacting the adsorbent radially inward, or by a thermal gradient of higher temperature radially inward.

Figure 5:
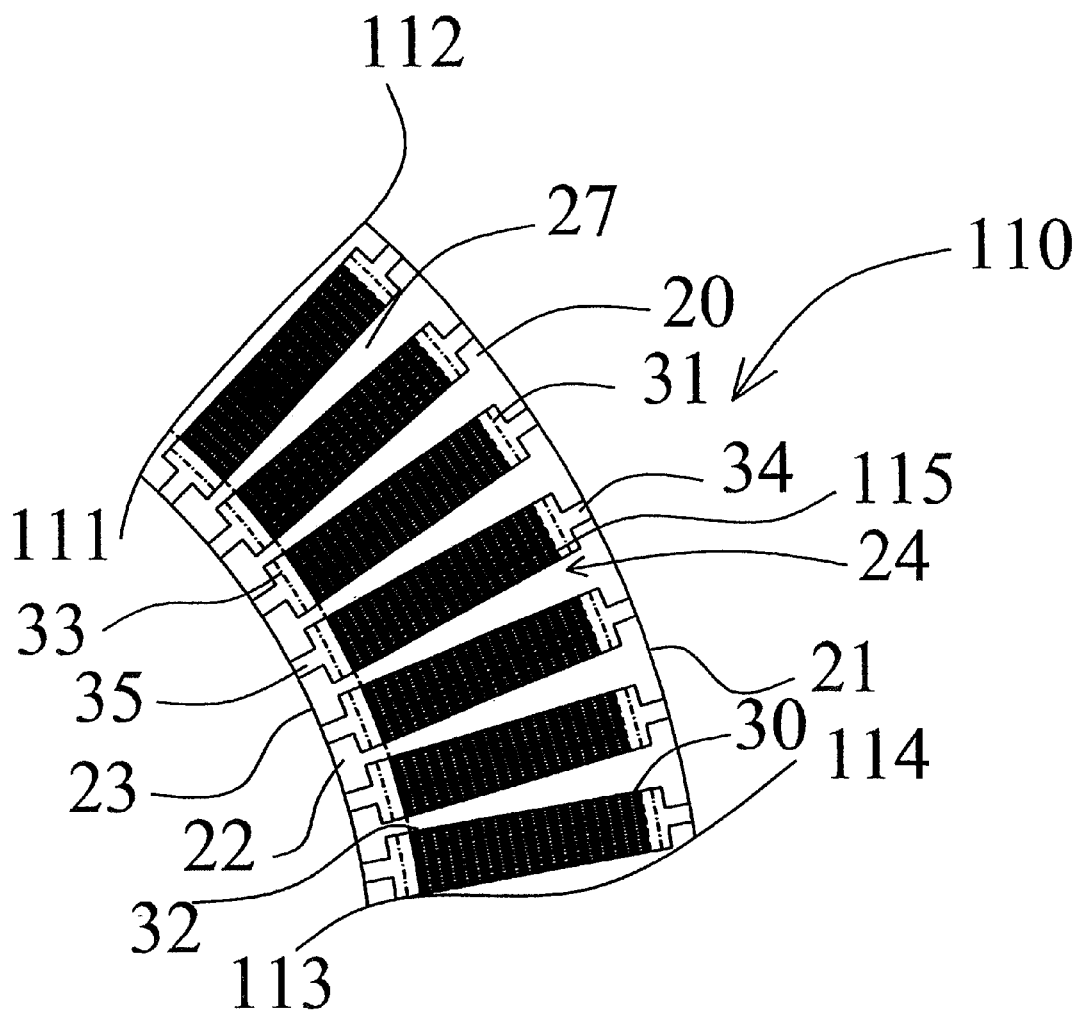
FIG. 5 shows an alternative adsorber configuration using layered adsorbent sheets.

Alternatively, convective stability in air separation applications may be enhanced by operating with the feed applied to an inner radius of radial flow rotating adsorbers, while the oxygen as second product is withdrawn from an outer radius. FIG. 5

An attractive alternative to the use of granular adsorbent is obtained by forming the adsorbent material with a suitable reinforcement matrix into thin adsorbent sheets, and layering the adsorbent sheets with spacers to form a layered sheet contactor with flow channels between adjacent pairs of sheets. The adsorber elements may then be installed as angularly spaced rectangular blocks within the rotor and between the first and second valve faces, with the adsorbent sheets as substantially flat sheets extending parallel to the plane defined by the axis of the rotor and a radius from the axis through the rectangular block, and the flat adsorbent sheets being layered with flow channels between them to form the rectangular block. The flow channels also lie in planes parallel to the sheets and to the plane defined by the axis of the rotor and a radius from the axis through the rectangular blocks, and may be configured for either axial flow or radial flow. In the axial flow case, the first and second valve surfaces would be provided as flat discs perpendicular to and concentric with the axis of rotation. In the radial flow case, represented by FIGS. 1–4, the first and second valve surfaces are provided as inner and outer cylindrical surfaces bounding the annular rotor within which the adsorber elements are mounted.

A section 110 of rotor 11 has been identified in FIG. 2 between the curved lines with endpoints 111 and 112, and 113 and 114. FIG. 5 shows section 110 in detail, with the laminated sheet embodiment of the adsorbers.

The laminate sheets 115 lie in the radial plane and are layered to form the adsorber elements 24 as rectangular blocks. Each sheet 115 comprises reinforcement material, e.g. a glass fiber or metal wire matrix (woven or non-woven) on which the adsorbent material (e.g. zeolite crystallites) is supported by a suitable binder (e.g., clay, silicate or coke binders). Typical thickness of an adsorbent sheet may be about 100 microns. The sheets 115 are installed with spacers on one or both sides to establish flow channels between adjacent pairs of sheets. The flow channels define the flow path approximately in the radial direction between first end 30 and second end 32 of the flow path in each adsorber element. Typical channel height would be about 50% to 100% of the adsorbent sheet thickness.

The adsorbent sheets comprise a reinforcement material, preferably glass fibre, but alternatively metal foil or wire mesh, to which the adsorbent material is attached with a suitable binder. For air separation to produce enriched oxygen, typical adsorbents are X, A or chabazite type zeolites, typically exchanged with calcium or lithium cations. The zeolite crystals are bound with silica, clay and other binders within the adsorbent sheet matrix.

Satisfactory adsorbent sheets have been made by coating a slurry of zeolite crystals with binder constituents onto the reinforcement material, with successful examples including non-woven fiber glass scrims, woven metal fabrics, and expanded aluminum foils. Spacers are provided by printing or embossing the adsorbent sheet with a raised pattern, or by placing a fabricated spacer between adjacent pairs of adsorbent sheets. Alternative satisfactory spacers have been provided as woven metal screens, fiber glass scrims, and metal foils with etched flow channels in a photolithographic pattern.

Typical experimental sheet thicknesses have been 150 microns, with spacer heights in the range of 100 to 150 microns, and adsorber flow channel length approximately 20 cm. Using X type zeolites, excellent performance has been achieved in oxygen separation from air at PSA cycle frequencies in the range of 50 to 100 cycles per minute.

Figure 6:
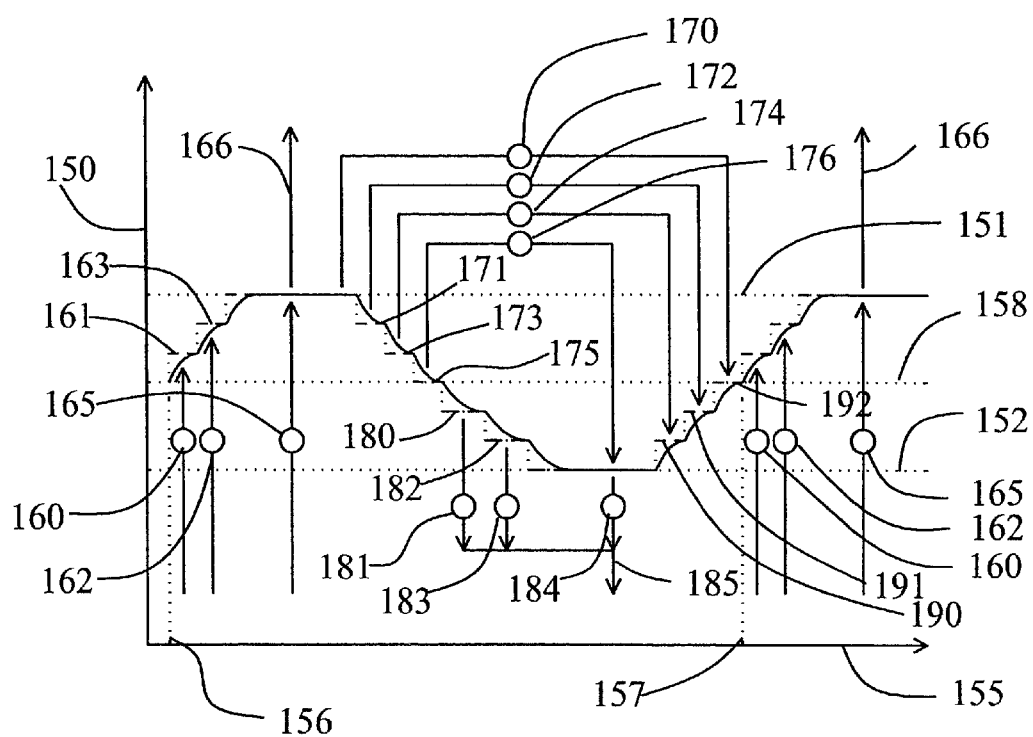
FIG. 6 shows a typical PSA cycle according to the invention.
Figure 7:
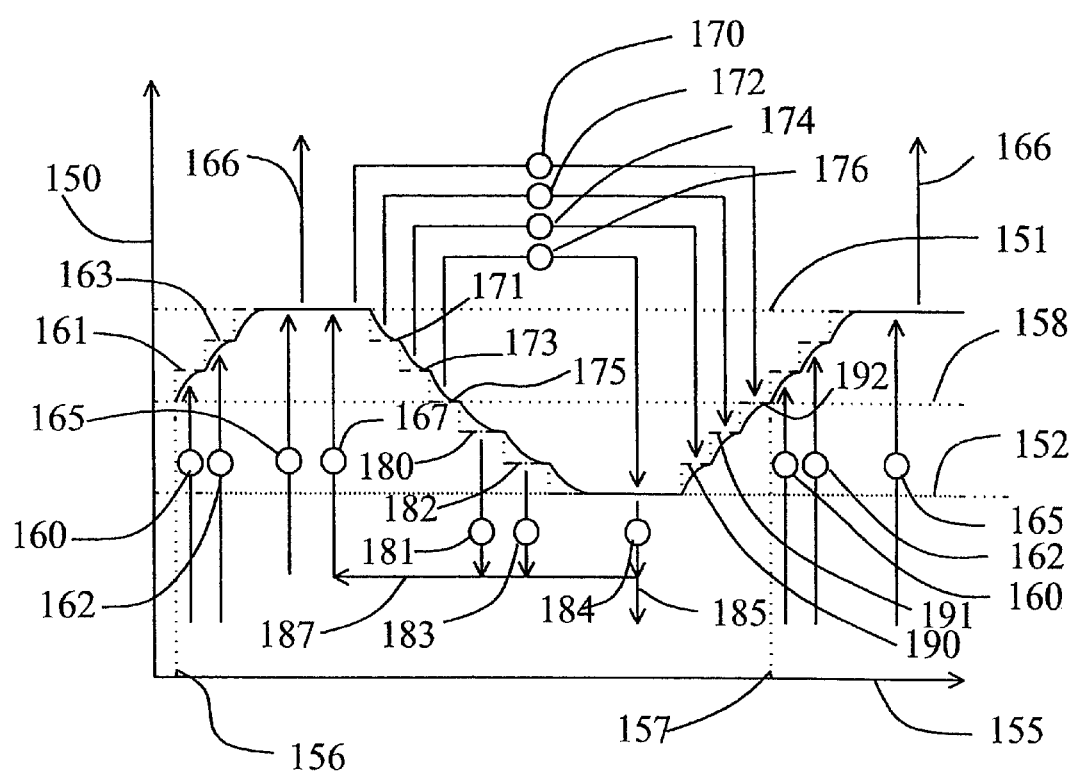
FIG. 7 shows a PSA cycle with heavy reflux.

FIGS. 6 and 7

FIG. 6 shows a typical PSA cycle according to the invention, while FIG. 7 shows a similar PSA cycle with heavy reflux recompression of a portion of the first product gas to provide a second feed gas to the process.

In FIGS. 6 and 7, the vertical axis 150 indicates the working pressure in the adsorbers and the pressures in the first and second compartments. Pressure drops due to flow within the adsorber elements are neglected. The higher and lower working pressures are respectively indicated by dotted lines 151 and 152.

The horizontal axis 155 of FIGS. 6 and 7 indicates time, with the PSA cycle period defined by the time interval between points 156 and 157. At times 156 and 157, the working pressure in a particular adsorber is pressure 158. Starting from time 156, the cycle for a particular adsorber (e.g. 24) begins as the first aperture 34 of that adsorber is opened to the first feed pressurization compartment 46, which is fed by first feed supply means 160 at the first intermediate feed pressure 161. The pressure in that adsorber rises from pressure 158 at time 157 to the first intermediate feed pressure 161. Proceeding ahead, first aperture passes over a seal strip, first closing adsorber 24 to compartment 46 and then opening it to second feed pressurization compartment 50 which is fed by second feed supply means 162 at the second intermediate feed pressure 163. The adsorber pressure rises to the second intermediate feed pressure.

First aperture 34 of adsorber 24 is opened next to first feed compartment 52, which is maintained at substantially the higher pressure by a third feed supply means 165. Once the adsorber pressure has risen to substantially the higher working pressure, its second aperture 35 (which has been closed to all second compartments since time 156) opens to light product compartment 70 and delivers light product 166.

In the cycle of FIG. 7, first aperture 34 of adsorber 24 is opened next to second feed compartment 54, also maintained at substantially the higher pressure by a fourth feed supply means 167. In general, the fourth feed supply means supplies a second feed gas, typically richer in the more readily adsorbed component than the first feed gas provided by the first, second and third feed supply means. In the specific cycle illustrated in FIG. 7, the fourth feed supply means 167 is a "heavy reflux" compressor, recompressing a portion of the heavy product back into the apparatus. In the cycle illustrated in FIG. 6, there is no fourth feed supply means, and compartment 54 could be eliminated or consolidated with compartment 52 extended over a wider angular arc of the stator.

While feed gas is still being supplied to the first end of adsorber 24 from either compartment 52 or 54, the second end of adsorber 24 is closed to light product compartment 70 and opens to first light reflux exit compartment 72 while delivering "light reflux" gas (enriched in the less readily adsorbed component, similar to second product gas) to first light reflux pressure let-down means (or expander) 170. The first aperture 34 of adsorber 24 is then closed to all first compartments, while the second aperture 35 is opened successively to (a) second light reflux exit compartment 74, dropping the adsorber pressure to the first cocurrent blowdown pressure 171 while delivering light reflux gas to second light reflux pressure letdown means 172, (b) third light reflux exit compartment 76, dropping the adsorber pressure to the second cocurrent blowdown pressure 173 while delivering light reflux gas to third light reflux pressure letdown means 174, and (c) fourth light reflux exit compartment 78, dropping the adsorber pressure to the third cocurrent blowdown pressure 175 while delivering light reflux gas to fourth light reflux pressure letdown means 176. Second aperture 35 is then closed for an interval, until the light reflux return steps following the countercurrent blowdown steps.

The light reflux pressure let-down means may be mechanical expanders or expansion stages for expansion energy recovery, or may be restrictor orifices or throttle valves for irreversible pressure let-down. Either when the second aperture is closed after the final light reflux exit step (as shown in FIGS. 6 and 7), or earlier while light reflux exit steps are still underway, first aperture 34 is opened to first countercurrent blowdown compartment 56, dropping the adsorber pressure to the first countercurrent blowdown intermediate pressure 180 while releasing "heavy" gas (enriched in the more strongly adsorbed component) to first exhaust means 181. Then, first aperture 34 is opened to second countercurrent blowdown compartment 58, dropping the adsorber pressure to the first countercurrent blowdown intermediate pressure 182 while releasing heavy gas to second exhaust means 183. Finally reaching the lower working pressure, first aperture 34 is opened to heavy product compartment 60, dropping the adsorber pressure to the lower pressure 152 while releasing heavy gas to third exhaust means 184. Once the adsorber pressure has substantially reached the lower pressure while first aperture 34 is open to compartment 60, the second aperture 35 opens to purge compartment 80, which receives fourth light reflux gas from fourth light reflux pressure let-down means 176 in order to displace more heavy gas into first product compartment 60.

In FIG. 6, the heavy gas from the first, second and third exhaust means is delivered as the heavy product 185. In FIG. 7, this gas is partly released as the heavy product 185, while the balance is redirected as "heavy reflux" 187 to the heavy reflux compressor as fourth feed supply means 167. Just as light reflux enables an approach to high purity of the less readily adsorbed ("light") component in the light product, heavy reflux enables an approach to high purity of the more readily adsorbed ("heavy") component in the heavy product.

The adsorber is then repressurized by light reflux gas after the first and second apertures close to compartments 60 and 80. In succession, while the first aperture 34 remains closed at least initially, (a) the second aperture 35 is opened to first light reflux pressurization compartment 82 to raise the adsorber pressure to the first light reflux pressurization pressure 190 while receiving third light reflux gas from the third light reflux pressure letdown means 174, (b) the second aperture 35 is opened to second light reflux pressurization compartment 84 to raise the adsorber pressure to the second light reflux pressurization pressure 191 while receiving second light reflux gas from the second light reflux pressure letdown means 172, and (c) the second aperture 35 is opened to third light reflux pressurization compartment 86 to raise the adsorber pressure to the third light reflux pressurization pressure 192 while receiving first light reflux gas from the first light reflux pressure letdown means 170. Unless feed pressurization has already been started while light reflux return for light reflux pressurization is still underway, the process (as based on FIGS. 6 and 7) begins feed pressurization for the next cycle after time 157 as soon as the third light reflux pressurization step has been concluded.

The pressure variation waveform in each adsorber would be a rectangular staircase if there were no throttling in the first and second valves. In order to provide balanced performance of the adsorbers, preferably all of the apertures are closely identical to each other.

The rate of pressure change in each pressurization or blowdown step will be restricted by throttling in ports (or in clearance or labyrinth sealing gaps) of the first and second valve means, or by throttling in the apertures at first and second ends of the adsorbers, resulting in the typical pressure waveform depicted in FIGS. 6 and 7. Alternatively, the apertures may be opened slowly by the seal strips, to provide flow restriction throttling between the apertures and the seal strips, which may have a serrated edge (e.g. with notches or tapered slits in the edge of the seal strip) so that the apertures are only opened to full flow gradually. Excessively rapid rates of pressure change would subject the adsorber to mechanical stress, while also causing flow transients which would tend to increase axial dispersion of the concentration wavefront in the adsorber. Pulsations of flow and pressure are minimized by having a plurality of adsorbers simultaneously transmitting each step of the cycle, and by providing enough volume in the function compartments and associated manifolds so that they act effectively as surge absorbers between the compression machinery and the first and second valve means.

It will be evident that the cycle could be generalized by having more or fewer intermediate stages in each major step of feed pressurization, countercurrent blowdown exhaust, or light reflux. Furthermore, in air separation or air purification applications, a stage of feed pressurization (typically the first stage) could be performed by equalization with atmosphere as an intermediate pressure of the cycle. Similarly, a stage of countercurrent blowdown could be performed by equalization with atmosphere as an intermediate pressure of the cycle.

FIG. 8

FIGS. 8–15 are simplified schematics of PSA systems using the module 10 of FIGS. 1–4 as the basic building block, and showing the connections from the first and second manifolds of the module to machinery for compression and expansion of gases in typical applications. In FIGS. 8–15, the reference numerals of the first and second manifolds are as defined for FIG. 3.

Figure 8:
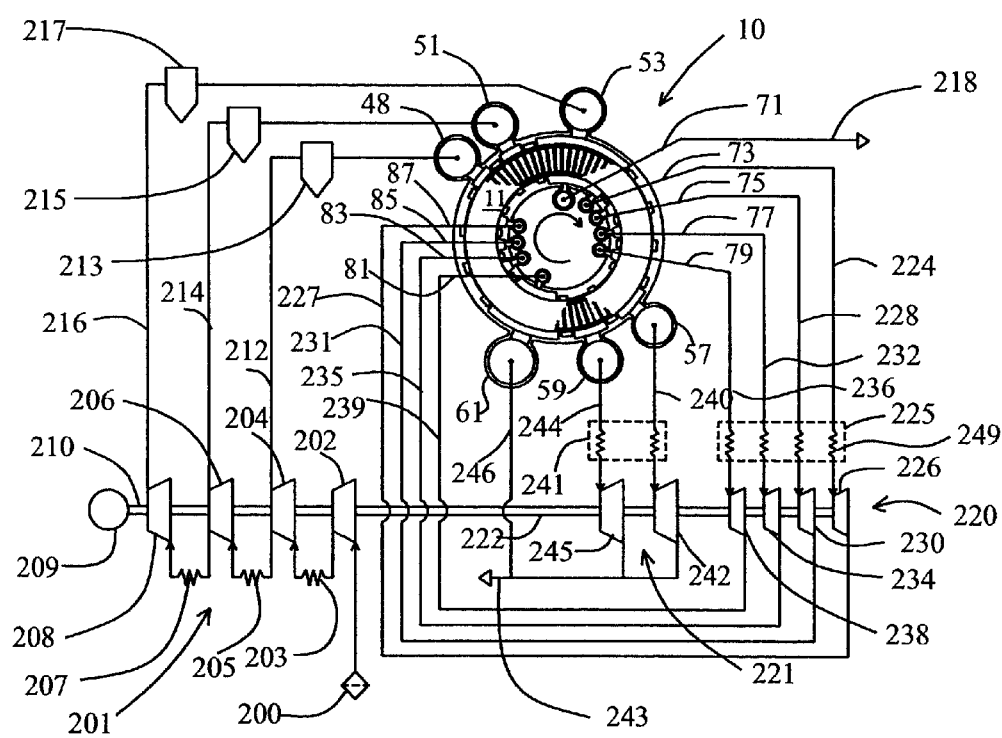
FIG. 8 shows a PSA apparatus with a single rotary module and energy recovery.

FIG. 8 is a simplified schematic of a PSA system for separating oxygen from air, using nitrogen-selective zeolite adsorbents. The light product is concentrated oxygen, while the heavy product is nitrogen-enriched air usually vented as waste. The cycle lower pressure 152 is nominally atmospheric pressure. Feed air is introduced through filter intake 200 to a feed compressor 201. The feed compressor includes compressor first stage 202, intercooler 203, compressor second stage 204, second intercooler 205, compressor third stage 206, third intercooler 207, and compressor fourth stage 208. The feed compressor 201 as described may be a four stage axial compressor or centrifugal compressor with motor 209 as prime mover coupled by shaft 210, and the intercoolers are optional. With reference to FIG. 6, the feed compressor first and second stages are the first feed supply means 160, delivering feed gas at the first intermediate feed pressure 161 via conduit 212 and water condensate separator 213 to first feed pressurization manifold 48. Feed compressor third stage 206 is the second feed supply means 162, delivering feed gas at the second intermediate feed pressure 163 via conduit 214 and water condensate separator 215 to second feed pressurization manifold 51. Feed compressor fourth stage 208 is the third feed supply means 165, delivering feed gas at the higher pressure 151 via conduit 216 and water condensate separator 217 to feed manifold 53. Light product oxygen flow is delivered from light product manifold 71 by conduit 218, maintained at substantially the higher pressure less frictional pressure drops.

The apparatus of FIG. 8 includes energy recovery expanders, including light reflux expander 220 (here including four stages) and countercurrent blowdown expander 221 (here including two stages), coupled to feed compressor 201 by shaft 222. The expander stages may be provided for example as radial inflow turbine stages, as full admission axial turbine stages with separate wheels, or as partial admission impulse turbine stages combined in a single wheel as illustrated in FIGS. 17–20 below.

Light reflux gas from first light reflux exit manifold 73 flows at the higher pressure via conduit 224 and heater 225 to first light pressure letdown means 170 which here is first light reflux expander stage 226, and then flows at the third light reflux pressurization pressure 192 by conduit 227 to the first light reflux return manifold 87. Light reflux gas from second light reflux exit manifold 75 flows at the first cocurrent blowdown pressure 171 via conduit 228 and heater 225 to second light reflux pressure letdown means 172, here the second expander stage 230, and then flows at the second light reflux pressurization pressure 191 by conduit 231 to the second light reflux return manifold 85. Light reflux gas from third light reflux exit manifold 77 flows at the second cocurrent blowdown pressure 173 via conduit 232 and heater 225 to third light reflux pressure letdown means 174, here the third expander stage 234, and then flows at the first light reflux pressurization pressure 190 by conduit 235 to the third light reflux return manifold 83. Finally, light reflux gas from fourth light reflux exit manifold 79 flows at the third cocurrent blowdown pressure 175 via conduit 236 and heater 225 to fourth light reflux pressure letdown means 176, here the fourth light reflux expander stage 238, and then flows at substantially the lower pressure 152 by conduit 239 to the fourth light reflux return manifold 81.

Heavy countercurrent blowdown gas from first countercurrent blowdown manifold 57 flows at first countercurrent blowdown intermediate pressure 180 by conduit 240 to heater 241 and thence to first stage 242 of the countercurrent blowdown expander 221 as first exhaust means 181, and is discharged from the expander to exhaust manifold 243 at substantially the lower pressure 152. Countercurrent blowdown gas from second countercurrent blowdown manifold 59 flows at second countercurrent blowdown intermediate pressure 182 by conduit 244 to heater 241 and thence to second stage 245 of the countercurrent blowdown expander 221 as second exhaust means 183, and is discharged from the expander to exhaust manifold 243 at substantially the lower pressure 152. Finally, heavy gas from heavy product exhaust manifold 61 flows by conduit 246 as third exhaust means 184 to exhaust manifold 243 delivering the heavy product gas 185 to be vented at substantially the lower pressure 152.

Heaters 225 and 241 raise the temperatures of gases entering expanders 220 and 221, thus augmenting the recovery of expansion energy and increasing the power transmitted by shaft 222 from expanders 220 and 221 to feed compressor 201, and reducing the power required from prime mover 209 While heaters 225 and 241 are means to provide heat to the expanders, intercoolers 203, 205 and 207 are means to remove heat from the feed compressor and serve to reduce the required power of the higher compressor stages. The haters and intercoolers are optional features of the invention.

If light reflux heater 249 operates at a sufficiently high temperature so that the exit temperature of the light reflux expansion stages is higher than the temperature at which feed gas is delivered to the feed manifolds by conduits 212, 214 and 216, the temperature of the second ends 35 of the adsorbers 24 may be higher than the temperature of their first ends 34. Hence, the adsorbers have a thermal gradient along the flow path, with higher temperature at their second end relative to the first end. This is an extension of the principle of "thermally coupled pressure swing adsorption" (TCPSA), introduced by Keefer in U.S. Pat. No. 4,702,903. Adsorber rotor 11 then acts as a thermal rotary regenerator, as in regenerative gas turbine engines having a compressor 201 and an expander 220. Heat provided to the PSA process by heater 225 assists powering the process according to a regenerative thermodynamic power cycle. similar to advanced regenerative gas turbine engines approximately realizing the Ericsson thermodynamic cycle with intercooling on the compression side and interstage heating on the expansion side.

In the instance of PSA applied to oxygen separation from air, the total light reflux flow is much less than the feed flow because of the strong bulk adsorption of nitrogen. Accordingly the power recoverable from the expanders is much less than the power required by the compressor, but will still contribute significantly to enhanced efficiency of oxygen production. By operating the adsorbers at moderately elevated temperature and using strongly nitrogen-selective adsorbents such as Ca—X, Li—X or calcium chabazite zeolites, a PSA oxygen generation system can operate with favourable performance and exceptional efficiency. While higher temperature of the adsorbent will reduce nitrogen uptake and selectivity, the isotherms will be more linear. Effective working capacity in superatmnospheric pressure PSA cycles may be enhanced by operation in TCPSA mode with an elevated temperature gradient in the adsorbers. Working with adsorbents such as Ca—X and Li—X, recent conventional practice has been to operate ambient temperature PSA at subatmospheric lower pressures in so-called "vacuum swing adsorption" (VSA), so that the highly selective adsorbents operate well below saturation in nitrogen uptake, and have a large working capacity in a relatively linear isotherm range. At higher temperatures, saturation in nitrogen uptake is shifted to more elevated pressures, so the optimum PSA cycle higher and lower pressures are also shifted upward. For satisfactory operation of the apparatus of FIG. 8, the typical operating temperature of the second ends of the adsorbers may be approximately 50° C. for Ca—X or Li—X, and 100° to 150° C. for calcium chabazite.

Figure 10:
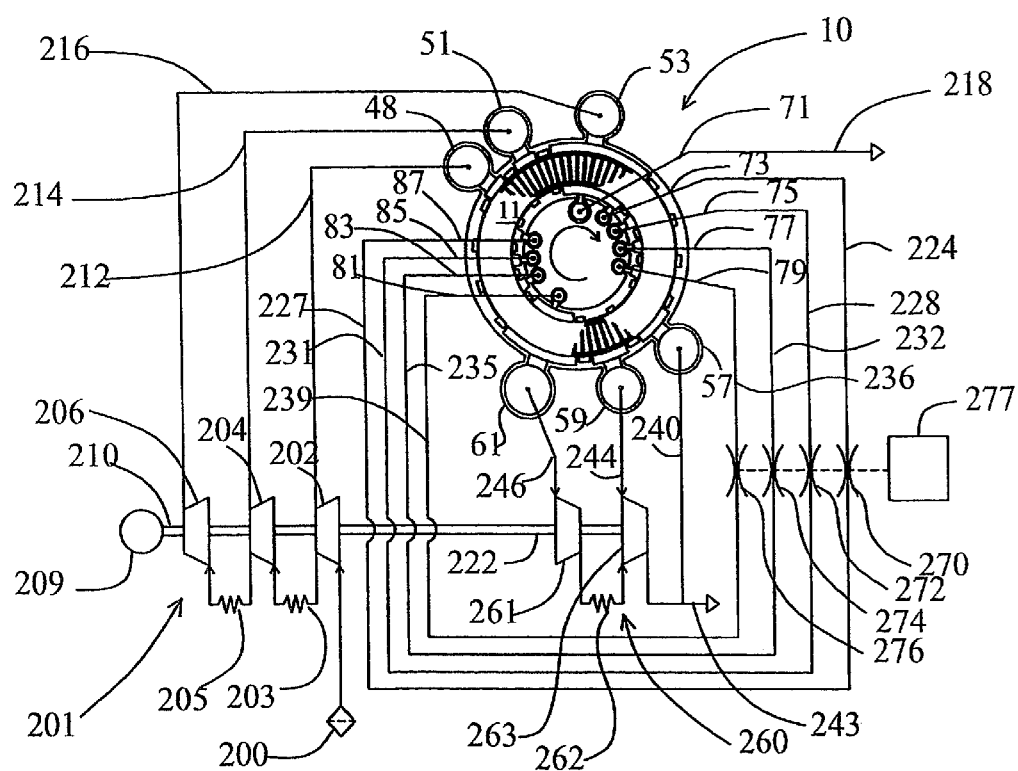
FIG. 10 shows a VPSA apparatus without light reflux energy recovery.

If high energy efficiency were not of highest importance, the light reflux expander stages and the countercurrent blowdown expander stages could be replaced by restrictor orifices or throttle valves for pressure letdown, as illustrated in FIG. 10. The schematic of FIG. 8 shows a single shaft supporting the compressor stages, the countercurrent blowdown or exhaust expander stages, and the light reflux stages, as well as coupling the compressor to the prime mover. However, it should be understood that separate shafts and even separate prime movers may be used for the distinct compression and expansion stages within the scope of the present invention.

It should also be understood that the number of compression stages and the number of expansion stages (as well as the number of vacuum pump stages in the embodiment of FIG. 9 below) may be varied within the scope of the invention. Generally and for equal stage efficiency of the compressor or expander type chosen, a larger number of stages will improve the PSA process efficiency, since the irreversible equalization expansions over the first and second orifices will be performed over narrower pressure intervals. However, the improvement in efficiency for each additional stage will diminish as the number of stages is greater.

FIG. 9

Figure 9:
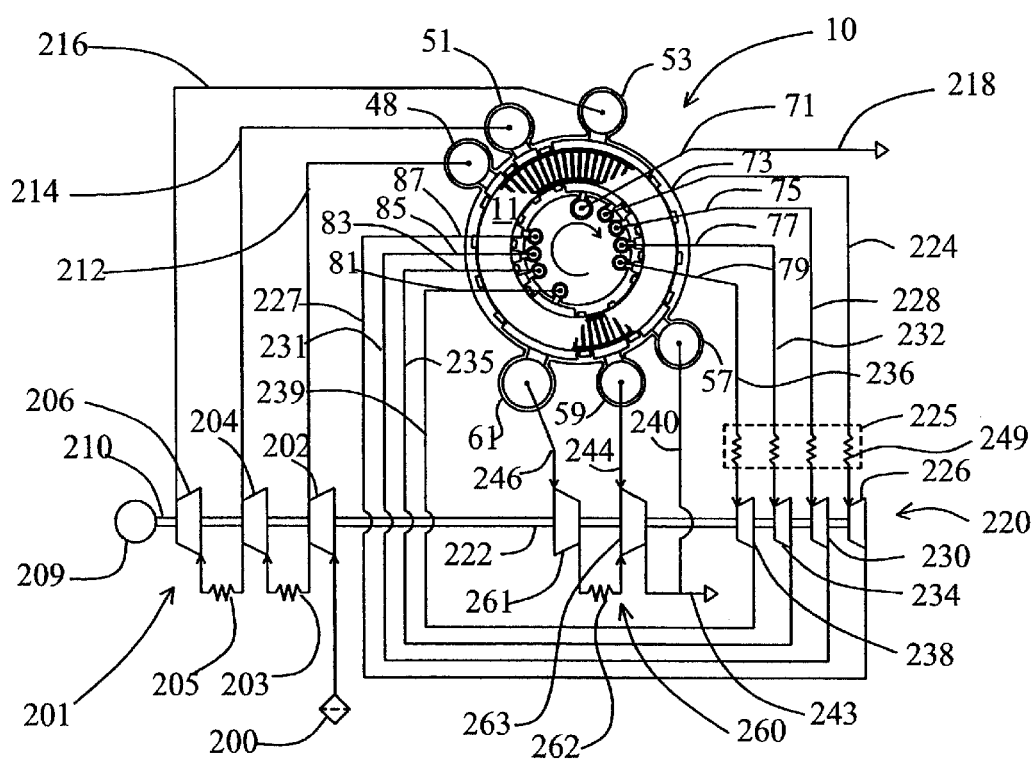
FIG. 9 shows a vacuum PSA (VPSA) for oxygen separation from air.

FIG. 9 shows a vacuum PSA (VPSA) system for oxygen separation from air. Intermediate pressure 158 of FIG. 6 is now nominally atmospheric pressure. Lower pressure 152 and higher pressure 151 may respectively be approximately 0.5 and 1.5 times atmospheric pressure. Feed compressor first stage 202 becomes directly the first feed means feeding manifold 48. Likewise, compressor second stage 204 and third stage 206 operate as the second feed means 162 and third feed means 165 respectively. The condensate separators are omitted for simplicity.

A multistage vacuum pump 260 is driven by shaft 222, and assisted by light reflux expander 220. The vacuum pump may for example be a multistage centrifugal or axial compression machine, or it may be provided by rotary positive displacement machinery adapted to accept inlet gas at multiple suction pressures. First stage vacuum pump 261 (acting as third exhaust means 184) draws nitrogen-enriched air from the heavy product exhaust manifold 61 at substantially the lower pressure, and delivers this gas through intercooler 262 at the second countercurrent blowdown pressure 182 to second stage vacuum pump 263 (acting as second exhaust means 182) which also draws heavy gas from the second countercurrent blowdown manifold 59 at the same pressure. The combined heavy gas discharged from vacuum pump 260 is combined with heavy gas discharged by conduit 240 (acting as first exhaust means 181) to form the heavy product 185 delivered to atmosphere (equal to the first countercurrent blowdown pressure) by conduit 243.

FIG. 10

FIG. 10 shows a VPSA apparatus similar to that of FIG. 9, but with the light reflux pressure letdown means 170, 172, 174 and 176 provided respectively by throttle orifices 270, 272, 274, aid 276. The throttle orifices may be fixed orifices, or may be throttle valves with a control actuator 277 for coordinated adjustment of their orifice aperture. Control actuator 277 provides means to adjust the rate of pressure letdown for each light reflux step, so that the process may be adjusted for operation at a different cycle frequency or a different ratio of the higher and lower working pressures. It should be noted that adjustable nozzles (similar to the above adjustable throttles with controller 277) may be alternatively used in conjunction with expansion turbines used for each of the light reflux (or countercurrent blowdown expander stages.

FIG. 11

Figure 11:
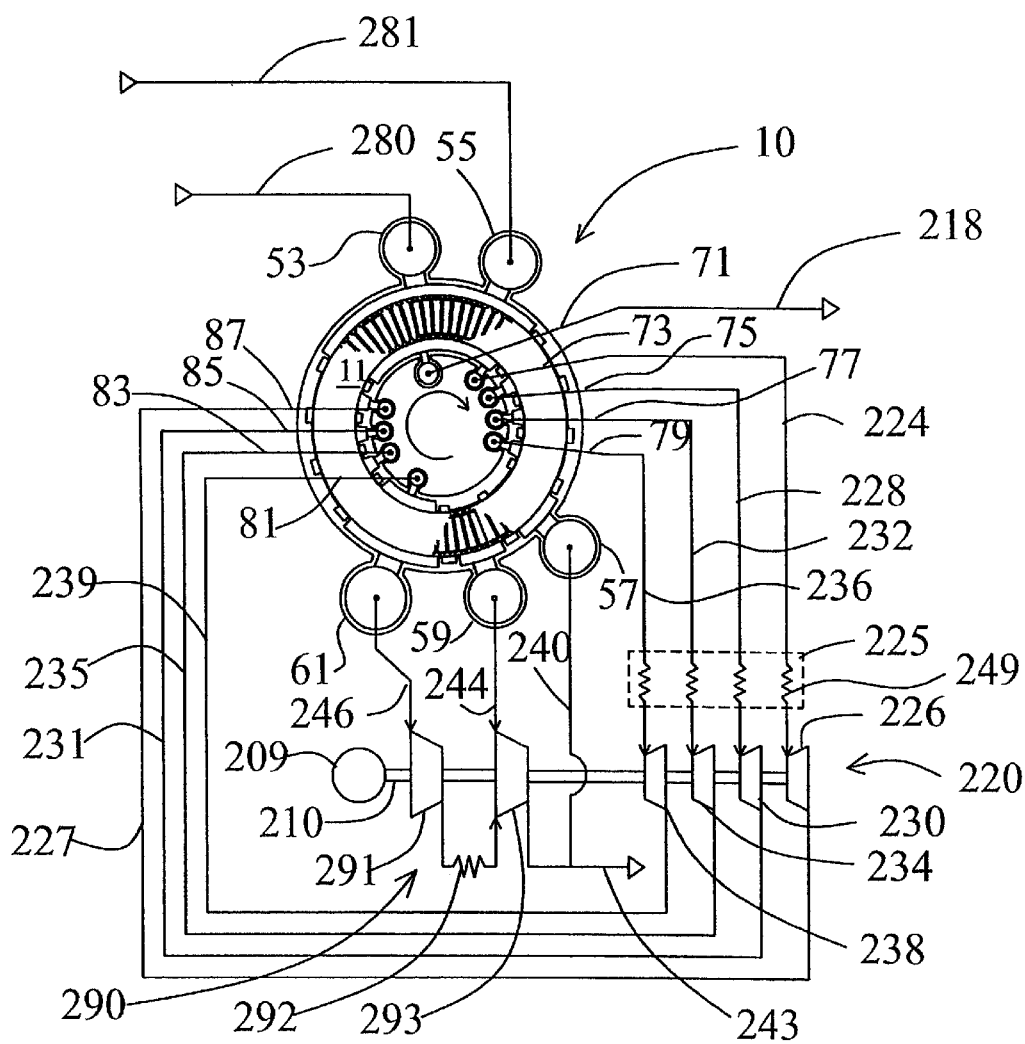
FIG. 11 shows a PSA apparatus adapted to receive two feed gas mixtures, and with recompression of tall gas.

FIG. 11 shows a PSA apparatus adapted to receive two feed gas mixtures, and with recompression of the heavy product gas. A suitable application would be hydrogen recovery from petroleum refinery offgases, e.g. hydrotreater purge gases typically containing light hydrocarbon gases with 30% to 70% hydrogen. Frequently, several offgases of differing hydrogen concentration are available at elevated feed pressures in the range of 10 to 20 atmospheres. Using typical adsorbents, e.g. activated carbon or zeolites, the hydrocarbon impurities will be much more readily adsorbed than hydrogen, so the purified hydrogen will be the light product delivered at the higher working pressure which may be only slightly less than the feed supply pressure, while the impurities will be concentrated as the heavy product and will be exhausted from the PSA process as "PSA tail gas" at the lower working pressure. The tail gas is often either flared or used as fuel gas.

For hydrogen duty, positive displacement expansion and compression machinery (e.g. twin screw machines) may be preferred because of the low molecular weight of the gas. Such machines may be adapted in accordance with the invention with extra inlet and/or discharge ports to accept and deliver gas at multiple intermediate pressures.

Performance and productivity of PSA hydrogen recovery from refinery offgases (with the adsorbers working at near ambient temperature) will be greatly enhanced by operating with the lower working pressure as low as possible and preferably near atmospheric pressure. However, the tail gas is usually delivered at a pressure of at least 5 or 6 atmospheres, for disposal to the refinery fuel gas header. Compression costs, particularly for combustible gases under refinery safety constraints, may be prohibitively high.

The apparatus of FIG. 11 is configured to accept first and second feed gas mixtures, the first having a higher concentration of the less readily adsorbed component (e.g. hydrogen) while the second is more concentrated than the first feed gas mixture in the more readily adsorbed fraction. The first feed gas is supplied at substantially the higher working pressure by first infeed conduit 280 to first feed manifold 53, while the second feed gas is supplied at substantially the higher working pressure by second infeed conduit 281 to first feed manifold 35. Each adsorber receives the second feed gas after receiving the first feed gas. so that the concentration profile in the adsorber is monotonically declining in concentration of the more readily adsorbed component along its flow path from first end 34 to second end 35 of the flow path in adsorber element 24. All but the final pressurization steps are here achieved with light reflux gas. The final feed pressurzation (from the third light reflux pressurization pressure 192 directly to the higher pressure 151) is achieved as the first end of each adsorber is opened to compartment 52 communicating to manifold 53. Additional feed pressurization steps could readily be incorporated as in the embodiment of FIG. 8.

In this embodiment, the tail gas (heavy product) is discharged from second product delivery conduit at a higher pressure than the lower working pressure, in this example being approximately the first countercurrent blowdown pressure 180 of FIG. 6 with conduit 240 being first exhaust means 181. Tail gas is recompressed by tail gas compressor 290, with compressor first stage 291 being the third exhaust means 184 compressing the first product gas from exhaust manifold 61 via conduit 246, and delivering the first product gas after first stage compression through intercooler 292 to compressor second stage 293 which itself is the second exhaust means compressing second countercurrent blowdown gas from manifold 59 via conduit 244.

FIG. 12

Figure 12:
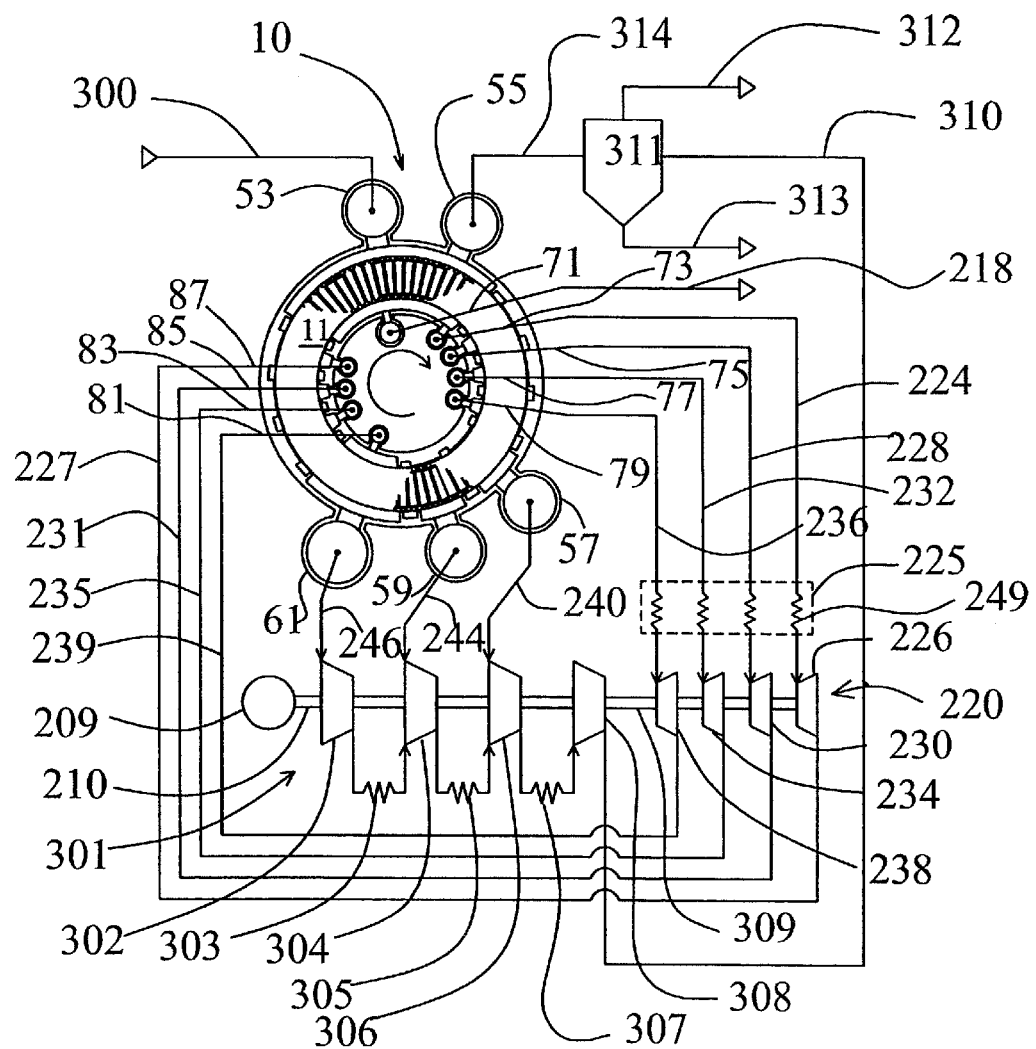
FIG. 12 shows a PSA apparatus with heavy reflux.

FIG. 12 shows a PSA apparatus with heavy reflux to obtain either higher enrichment and purity of the more readily adsorbed component into the heavy product, or higher yield (recovery) of the less readily adsorbed component into the light product. This apparatus may also be configured to deliver the heavy product at elevated pressure, here approximately the higher working pressure so that both product gases are delivered at about the higher pressure.

The apparatus of FIG. 12 has infeed conduit 300 to introduce the feed gas at substantially the higher pressure to first feed manifold 53. As in the example of FIG. 11, adsorber pressurization is achieved mainly by light reflux, with a final feed pressurization step through manifold 53.

A multistage heavy reflux compressor 301 has a first stage 302 as third exhaust means 184 of FIG. 7, drawing heavy gas by conduit 246 from first product exhaust manifold 61. and compressing this gas through intercooler 303 to second stage 304. Heavy reflux compressor second stage 304 as second exhaust means 183 also draws heavy gas from second countercurrent blowdown manifold 59 through conduit 244, and delivers this gas by intercooler 305 to third stage 306 which as first exhaust means 181 also draws heavy gas from first countercurrent blowdown manifold 57 through conduit 240, and delivers this gas by intercooler 307 to fourth stage 308 which attains substantially the higher working pressure of the PSA cycle. The heavy reflux compressor is driven by prime mover 209 through shaft 210, and by light reflux expander 220 through shaft 309.

The compressed heavy gas is conveyed from compressor fourth stage 308 by conduit 310 to condensate separator 311, from which the heavy product is delivered by conduit 312 which is externally maintained at substantially the higher pressure less frictional pressure drops. Condensed vapours (such as water or liquid hydrocarbons) are removed through conduit 313 at substantially the same pressure as the heavy product in conduit 312. The remaining heavy gas flow, after removal of the first product gas, flows by conduit 314 to the second feed manifold 55 as heavy reflux to the adsorbers following the feed step for each adsorber. The heavy reflux gas is a second feed gas, of higher concentration in the more readily adsorbed component or fraction than the first feed gas.

FIG. 13

Figure 13:
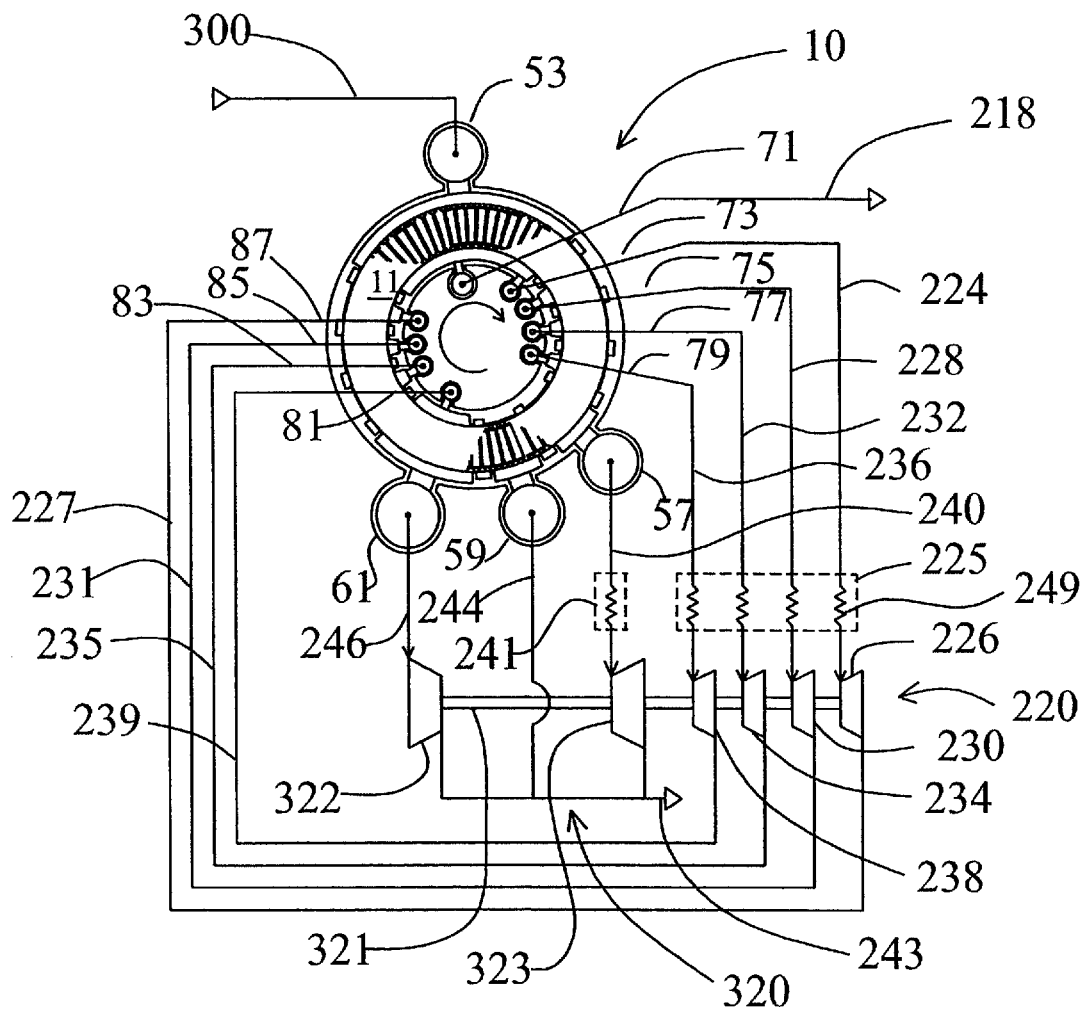
FIG. 13 shows a PSA apparatus with a free rotor tail gas compressor or vacuum pump, powered by energy recovery.

FIG. 13 shows a PSA apparatus with a free rotor tail gas compressor or vacuum pump, powered by energy recovery expanders analogous to a multistage turbocharger. Free rotor compressor 320 includes, on shaft 321, tail gas compressor 322 (or vacuum pump 322, if the lower pressure is subatmospheric) which is the third exhaust means 184 drawing heavy product gas or tail gas from exhaust manifold 61. In this example, the heavy product gas is discharged from conduit 243 at the second countercurrent blowdown pressure 182, which is above the lower pressure. Pressure 182 may here be atmospheric pressure, in which case the third exhaust means is a vacuum pump. Conduit 244 is the second exhaust means 183. The first exhaust means 181 is expander 323 coupled to shaft 321 of free rotor compressor 320. Expander 323 expands heavy gas flowing from manifold 57 through conduit 240 and optional heater 241, and releases that gas to exhaust conduit 243.

The light reflux expander 220 and the countercurrent blowdown expander 323 are both coupled to drive the tail gas compressor 322 by shaft 321, with no other source of mechanical power required. The application of energy recovery (from light reflux and countercurrent blowdown) provides the alternative benefits of reducing the lower pressure so as to improve PSA (or VPSA) cycle performance, or raising the first product delivery pressure as may be required e.g. for tail gas disposal, without the requirement for an electric motor driven compressor. This feature would be particularly useful for hydrogen separation, where reducing the lower pressure greatly improves performance, while elevated tail gas pressures may be desired. Alternatively, a hydrogen PSA system could be operated with a subatmospheric lower pressure, while the tail gas is discharged at sufficiently above atmospheric pressure for combustion in a flare or furnace.

FIG. 14

Figure 14:
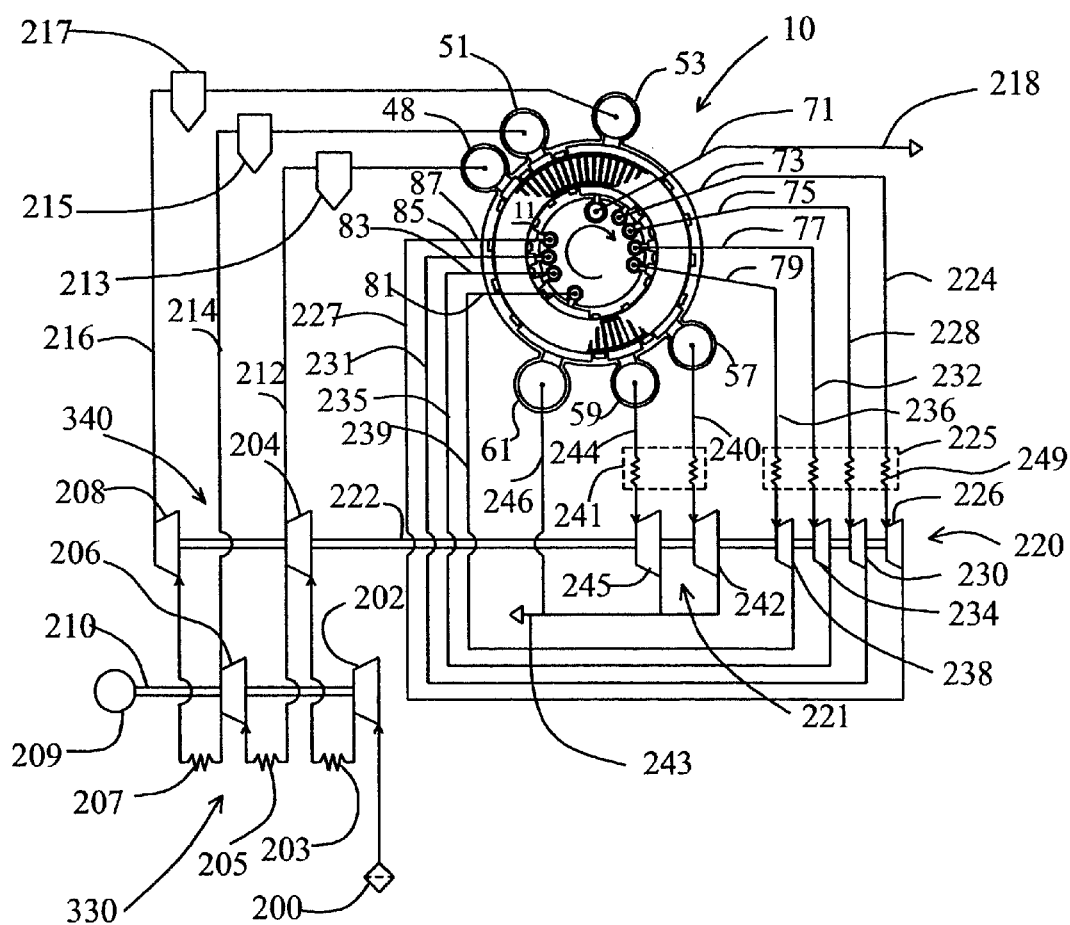
FIG. 14 shows another embodiment of a PSA apparatus with a free rotor compressor.

FIG. 14 shows another embodiment using a free rotor compressor or turbocharger. In this embodiment, applied to oxygen separation from air, a motor driven first feed compressor 330 is driven by prime mover 209 through shaft 210. Using the same nomenclature and reference numerals of feed compression stages as FIG. 8, feed compressor 330 includes feed compression first stage 202 and third stage 206 on shaft 210 driven by motor 209. Free rotor second compressor 340 includes feed compression second stage 04 and fourth stage 208 on shaft 222, driven by countercurrent blowdown expander 221 and light reflux expander 220 through shaft 222. This configuration enables operation of a motor driven feed compressor with a limited number of stages (here 2 stages) to operate a PSA cycle with a larger number of feed supply pressures (here the three pressures 161, 163 and 151 of FIG. 6), since the free rotor compressor has dual functions as means to boost feed pressure by application of thermally boosted expansion energy recovery, and means to split the stage intermediate pressures for supply to the PSA module.

FIG. 15

Figure 15:
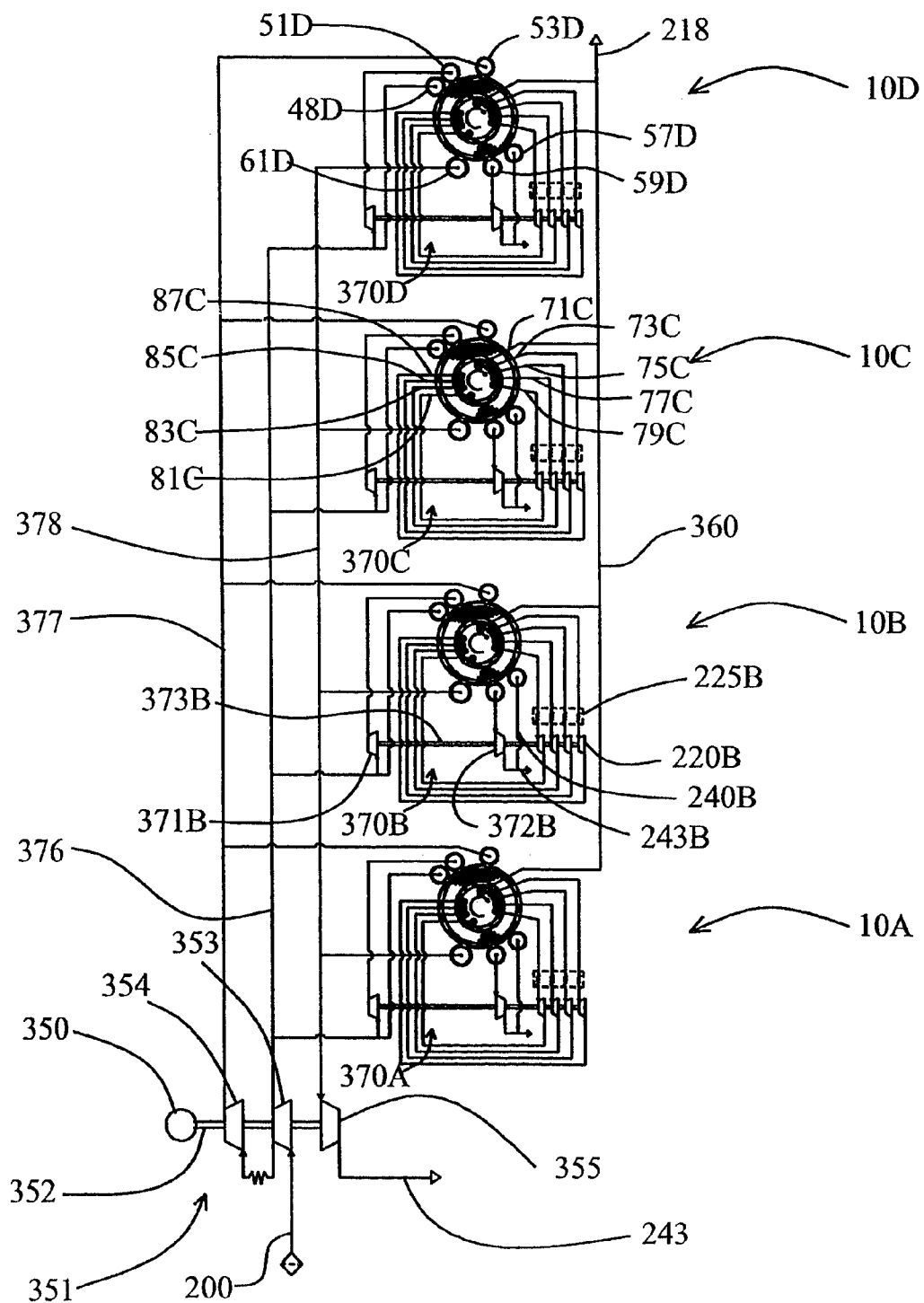
FIG. 15 shows a VPSA apparatus with 4 modules.

FIG. 15 shows a VPSA oxygen generation plant with 4 modules in parallel, each having a free rotor booster compressor powered by energy recovery expanders, and the entire apparatus having a single prime mover 350 which may for example be an electric motor or a gas turbine. Prime mover 350 drives first feed compressor 351 on shaft 352. Feed compressor 351 has a first stage 353 drawing feed gas from infeed conduit 200, and a third stage 354. The second stage of feed compression is provided by the free rotor compressors of each module. The first feed compressor 351 in this embodiment also includes an exhaust vacuum pump 355 likewise coupled to shaft 352.

Figure 16:
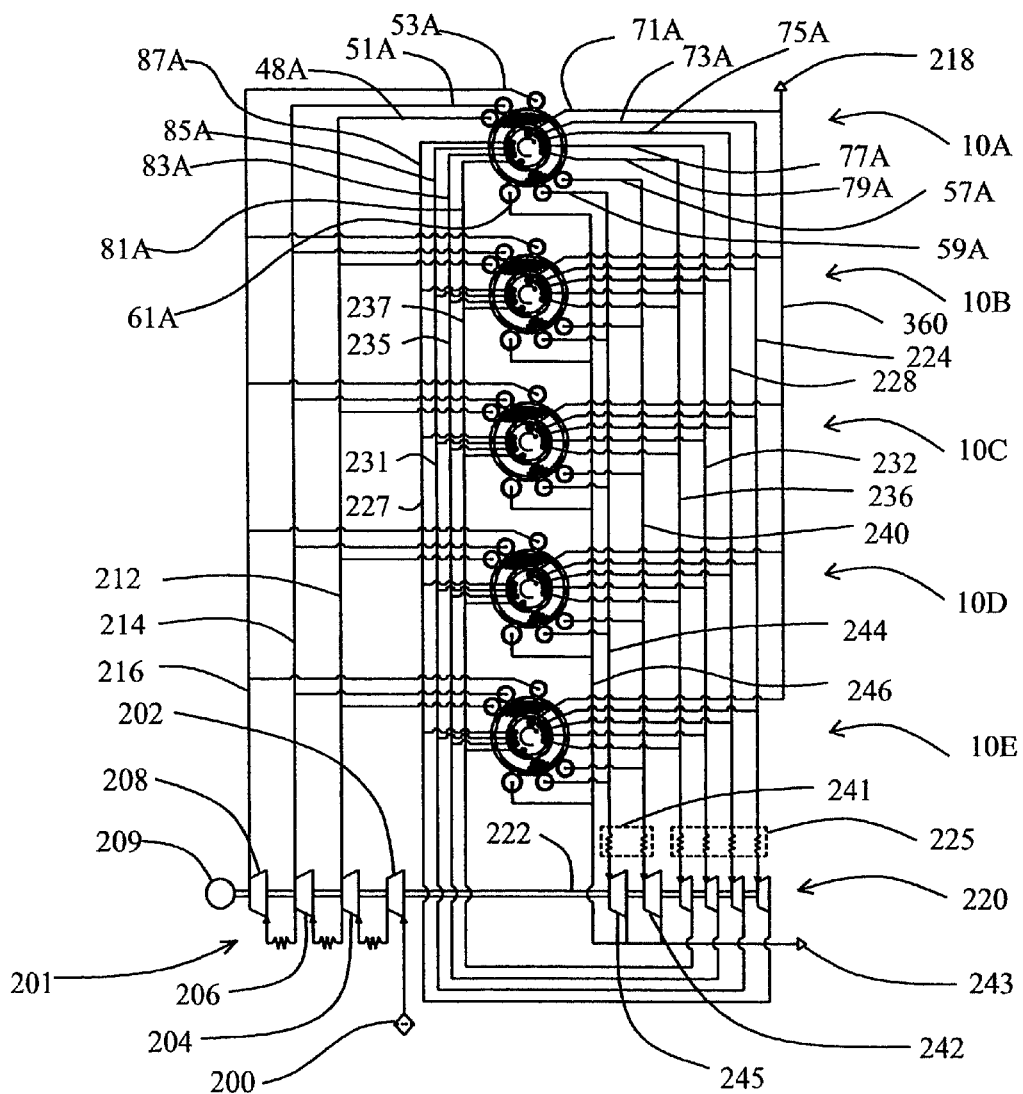
FIG. 16 shows a PSA apparatus with 5 modules.

The plant includes four identical modules 10A, 10B, 10C and 10D. In FIGS. 15 and 16, component nomenclature and reference numerals follow that established for FIGS. 1–14, with a suffix A to D appended to the reference numerals for module components, and each component so identified with reference to any one module will be identically found in each of the other modules. The first manifolds are identified with reference to module 10D as 48D and 51D for feed pressurization, 53D for feed supply at the higher pressure, 57D and 59D for countercurrent blowdown, and 61D for exhaust at the lower pressure. The second manifolds are identified with reference to module 10C as 71C communicating to light product delivery manifold 360 and delivery conduit 218, light reflux exit manifolds 73C, 75C, 77C and 79C, and light reflux return manifolds 81C, 83C, 85C and 87C.

The identical free rotor compressor for each module will be described with reference to module 10B. Free rotor compressor assembly 370B includes feed compression second stage 371B and vacuum pump 372B, both coupled by shaft 373B to light reflux expander 220B. Feed gas compressed by feed compressor first stage 353 is conveyed by feed manifold 376 in parallel to the first feed pressurization manifold (e.g. 48D) of each module, and to the inlet of feed compression second stage (e.g. 371B) of the free rotor compressor assembly (e.g. 370B) of each module which delivers further compressed feed pressurization gas to the second feed pressurization manifold (e.g. 51D) of each module. Feed gas compressed to the higher pressure by third feed compressor stage 354 is conveyed by feed manifold 377 in parallel to the first feed supply manifold (e.g. 53D) of each of the modules. Heavy gas at the lower pressure is drawn from the heavy compartment (e.g. 61D) of each module through vacuum exhaust manifold 378 to exhaust vacuum pump 355 as the third exhaust means. Countercurrent blowdown gas from the first countercurrent blowdown manifold (e.g. 57D) of each module is discharged by e.g. conduit 240B as first exhaust means, while countercurrent blowdown gas from the second countercurrent blowdown manifold (e.g. 59D) of each module is exhausted by vacuum pump (e.g. 372B) of the free rotor compressor assembly as second exhaust means, delivering the heavy tail gas to the module heavy product or waste gas exhaust, e.g. 243B.

FIG. 16

FIG. 16 shows a PSA apparatus with 5 modules 10A–10E. In this embodiment, the prime mover, all compressor stages and all expander stages are directly mechanically coupled (e.g. on a single shaft) following the embodiment and component descriptions of FIG. 8, with the only difference being the connection in parallel of multiple modules.

FIG. 17

In this example, sealing faces 21 and 23 are respectively provided as hard-faced ported surfaces on the first and second valve stators 40 and 41. Sliding seals 380 are provided on rotor 115 between each adsorber 24 and its neighbours, to engage both sealing faces 21 and 23 in fluid sealing contact. Seals 380 may have a wear surface of a suitable composite material based on PTFE or carbon, and should be compliantly mounted on rotor 11 so as to compensate for wear, deflections and misalignment. Ports 381 may be sized, particularly at the leading edge of each compartment, to provide controlled throttling for smooth pressure equalization between adsorbers and that compartment, as each adsorber in turn is opened to that compartment.

Split stream vacuum pump 260 receives the countercurrent blowdown and exhaust flow in three streams receiving exhaust gas at incrementally reduced pressures from countercurrent blowdown compartment 56, compartment 58 and compartment 60. The combined exhaust gas is discharged as heavy product gas. In this example, initial feed pressurization is performed from atmosphere, so a first feed pressurization conduit 382 admits feed air directly from inlet filter 200 to first feed pressurization compartment 46 at substantially atmospheric pressure. The first discharge port of feed compressor 201 now communicates to second feed pressurization compartment 50. The compressor is shown as a split stage machine with inlet 391, and three discharges 392, 393 and 394 at incrementally higher pressures.

In the option of light reflux pressure letdown with energy recovery, a split stream light reflux expander 220 is provided to provide pressure let-down of four light reflux stages with energy recovery. The light reflux expander provides pressure let-down for each of f our light reflux stages as illustrated. As indicated by dashed lines 395, the stages may optionally be compartmentalized within the light reflux expander to minimize mixing of gas concentration between the stages. The light product purity will tend to decline from the light reflux stages of higher pressure to those of lower pressure, so that a desirable stratification of the light reflux can be maintained if mixing is avoided.

Light reflux expander 220 is coupled to drive light product pressure booster compressor 396 by shaft 397. Compressor 396 receives the light product from compartment 70, and delivers light product (compressed to a delivery pressure above the higher pressure of the PSA cycle) from delivery conduit 218. Since the light reflux and light product are both enriched oxygen streams of approximately the same purity, expander 220 and light product compressor 396 may be hermetically enclosed in a single housing similar to a turbocharger.

FIG. 18

Figure 17:
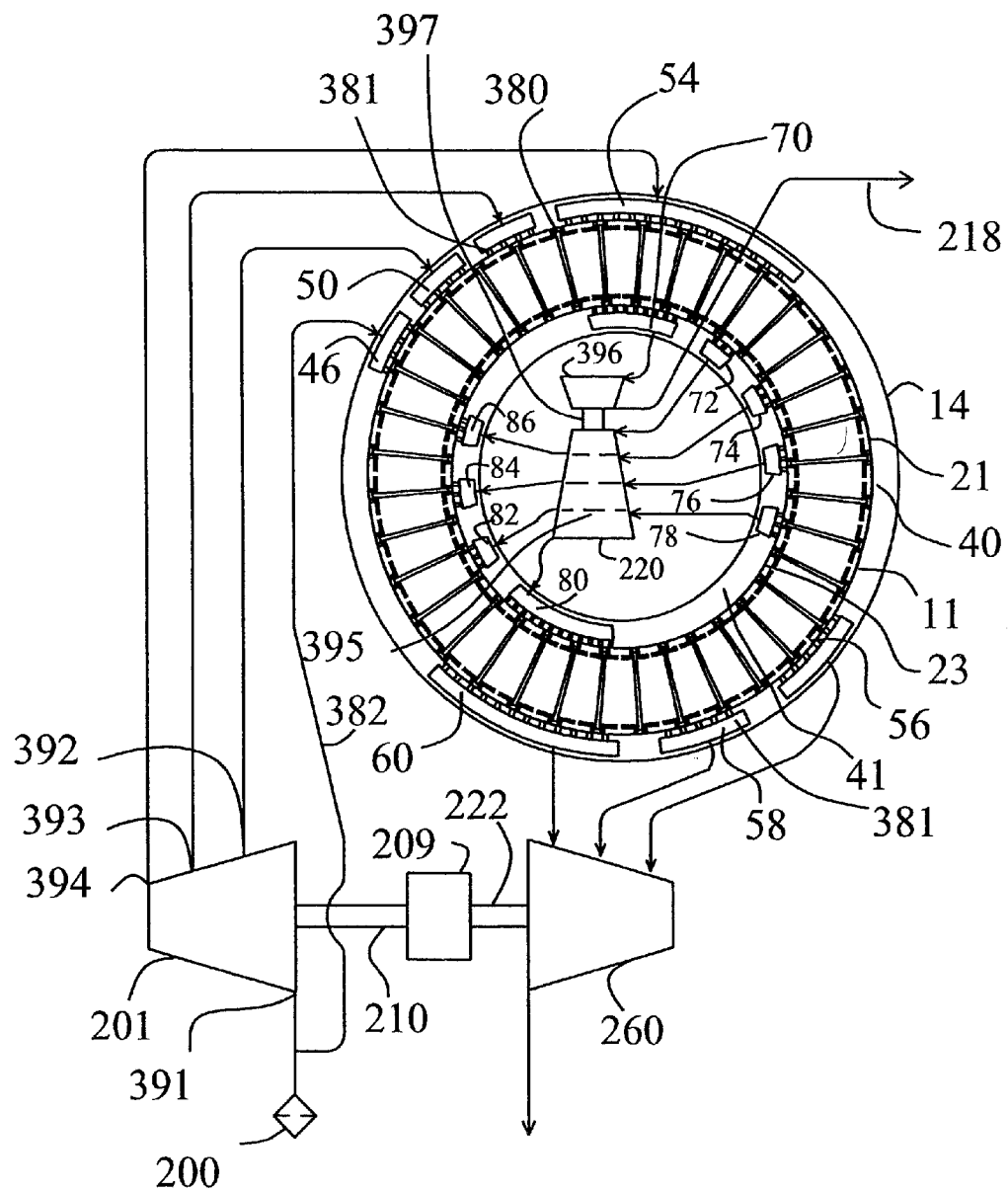
FIG. 17 shows a simplified schematic of a VPSA cycle for oxygen production, using a split stream air compressor, a split stream vacuum pump as the countercurrent blowdown exhauster, and a split stream light reflux expander powering a product oxygen compressor.
Figure 18:
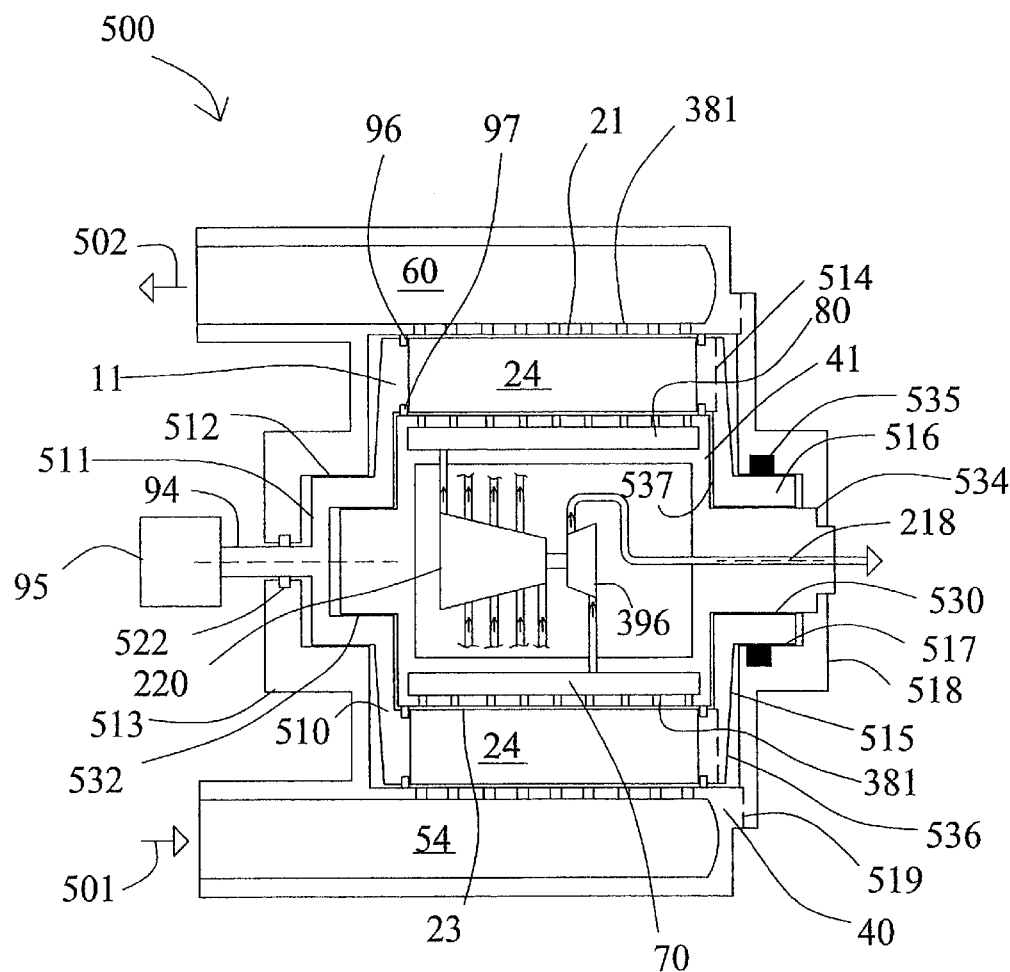
FIG. 18 shows a radial flow rotary PSA module.

FIG. 18 shows a radial flow rotary PSA module 500, contemplated for tonnage oxygen generation. With reference to FIG. 17, this view may be interpreted as an axial section through compartments 54 and 70 at the higher pressure, and compartments 80 and 60 at the lower pressure. Arrows 501 and 502 respectively indicate the feed and exhaust flows. Rotor 11 has a first end plate 510 with stub shaft 511 supported by bearing 512 in first bearing housing 513, which is integral with first valve stator 40. Rotor 11 is attached at assembly joint 514 to a second end plate 515 with stub shaft 516 supported by bearing 517 in second bearing housing 518, which is attached at assembly joint 519 to first valve stator 40.

Rotor 11 is driven by motor 95 connected to stub shaft 511 by shaft 94 penetrating housing 513 through shaft seal 522. First end plate 510 has no perforations that might compromise purity of the light product gas by leakage from the first valve surface to the second valve surface. Second end plate 515 is penetrated at bushing 530 by the second valve stator. Second valve stator 41 is a stationary pintle within rotor 11, with guide bushings 530 and 532, and is attached to the second bearing housing 518 at assembly face 534. Bearings 512 and 517 may be much smaller in diameter than the outer diameter of rotor 11 at sealing face 21. A shaft seal 535 is provided between shaft 516 and bearing 517, to prevent contamination of the light product gas by leakage from chamber 536 adjacent the first valve sealing face 21 to chamber 537 adjacent the second valve sealing face 23.

Preferably, seal 535 is tight against leakage so that product purity is not compromised. By configuring this seal at smaller diameter than the valve sealing faces, frictional torque from shaft seal 535 is greatly reduced than if this seal were at the full rotor diameter. Leakage across seals in the first valve face is much less important, because moderate leakage across those seals simply reduced the volumetric efficiency of the process. Similarly, moderate leakage across the seals in the second valve face may be tolerated, as the concentration of light reflux gases and the light product gas that may leak across those seals is almost identical. Because moderate leakage across seals in the first valve surface (including circumferential seals 96), and across seals in the second valve surface (including circumferential seals 97), can be accepted, all of those seals may be designed for relatively light mechanical engagement to minimize frictional torque. In fact, use of narrow gap clearance seals or labyrinth seals with zero mechanical rubbing friction is an attractive option especially for larger capacity modules operating at high cycle frequency (e.g. 50 or 100 cycles per minute) where seal leakage flows would have a minimal effect on overall efficiency. Preferably, the seals in the first and second valve faces have consistent performance and leakage, so that all "N" adsorbers experience the same PSA cycle flow and pressure regime as closely as possible, without being upset by variations in leakage between the adsorbers.

Hence an important benefit of the present invention is that close tolerance sealing is only required on one dynamic rotary seal, shaft seal 535, whose diameter has been made much smaller than the rotor diameter to reduce the sealing perimeter as well as mechanical friction power loss. For a given rotary seal section and loading, rubbing friction power loss at given RPM is proportional to the square of the sealing face diameter.

Because of the compactness (similar to an automotive turbocharger) of a "turbocompressor" oxygen booster as described for FIG. 17 above, it is possible to install a split stream light reflux expander 220 with close-coupled light product compressor 396 inside the light valve stator. Compressed oxygen product is delivered by conduit 218.

FIG. 19

Figure 19:
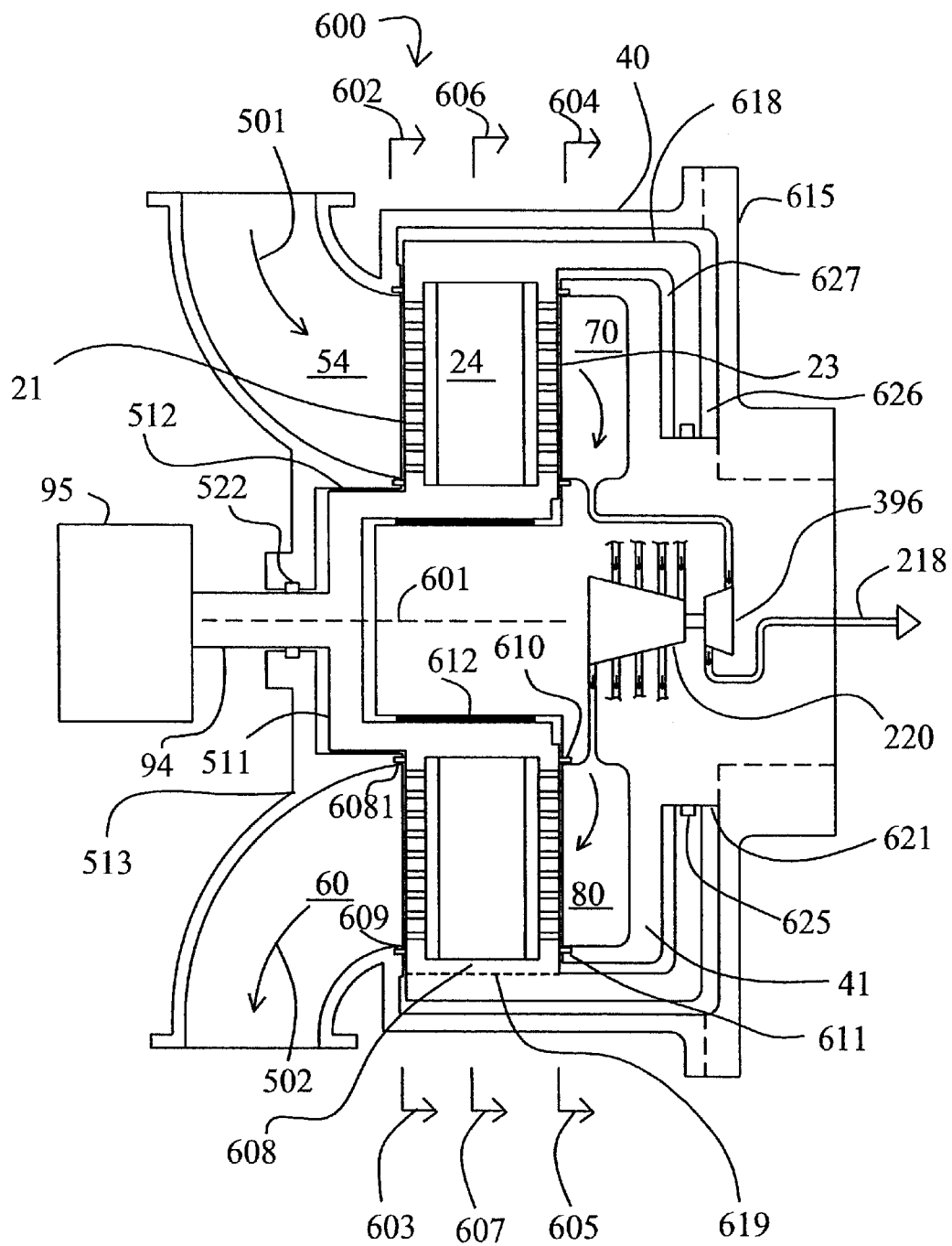
FIG. 19 shows an axial flow rotary PSA module.

FIG. 19 shows an axial flow rotary PSA module 600 for smaller scale oxygen generation. The flow path in adsorbers 24 is now parallel to axis 601. A better understanding will be obtained from FIGS. 20, 21 and 22, which are cross sections of module 600 in the planes respectively defined by arrows 602–603, 604–605, and 606–607. FIG. 19 is an axial section of module 600 through compartments 54 and 70 at the higher pressure, and compartments 60 and 80 at the lower pressure. The adsorber rotor 11 contains the "N" adsorbers 24 in adsorber wheel 608, and revolves between the first valve stator 40 and the second valve stator 41. Compressed feed air is supplied to compartment 54 as indicated by arrow 501, while nitrogen enriched exhaust gas is exhausted from compartment 60 as indicated by arrow 502.

At the ends of rotor 11, circumferential seals 6081 and 609 bound first sealing face 21, and circumferential seals 610 and 611 bound second sealing face 23. The sealing faces are flat discs. The circumferential seals also define the ends of seals between the adsorbers, or alternatively of dynamic seals in the sealing faces between the stator compartments. Rotor 11 has a stub shaft 511 supported by bearing 512 in first bearing housing 513, which is integral with first valve stator 40. Second valve stator 41 has a stub shaft engaging the rotor 11 with guide bushing 612.

A flanged cover plate 615 is provided for structural connection and fluid sealing enclosure between the first valve stator 40 and the second valve stator 41. Rotor 11 includes seal carrier 618 attached at joint 619 to adsorber wheel 608, and extending between the back of second valve stator 41 and cover plate 615 to sealing face 621 which is contacted by dynamic seal 625. Seal 625 prevents contamination of the light product gas by leakage from chamber 626 adjacent the first valve sealing face 21 to chamber 627 adjacent the second valve sealing face 23.

Seal 625 needs to be tight against leakage that could compromise product purity. By this seal to a smaller diameter than the valve faces outer diameter, frictional torque from this seal is greatly reduced than if this seal were at the full rotor diameter. The circumferential perimeter exposed to leakage is also reduced. As in FIG. 18, the light reflux pressure letdown means, illustrated as a split stream light reflux expander 220 with close-coupled light product compressor 396, may be installed inside the light valve stator.

FIG. 20

Figure 20:
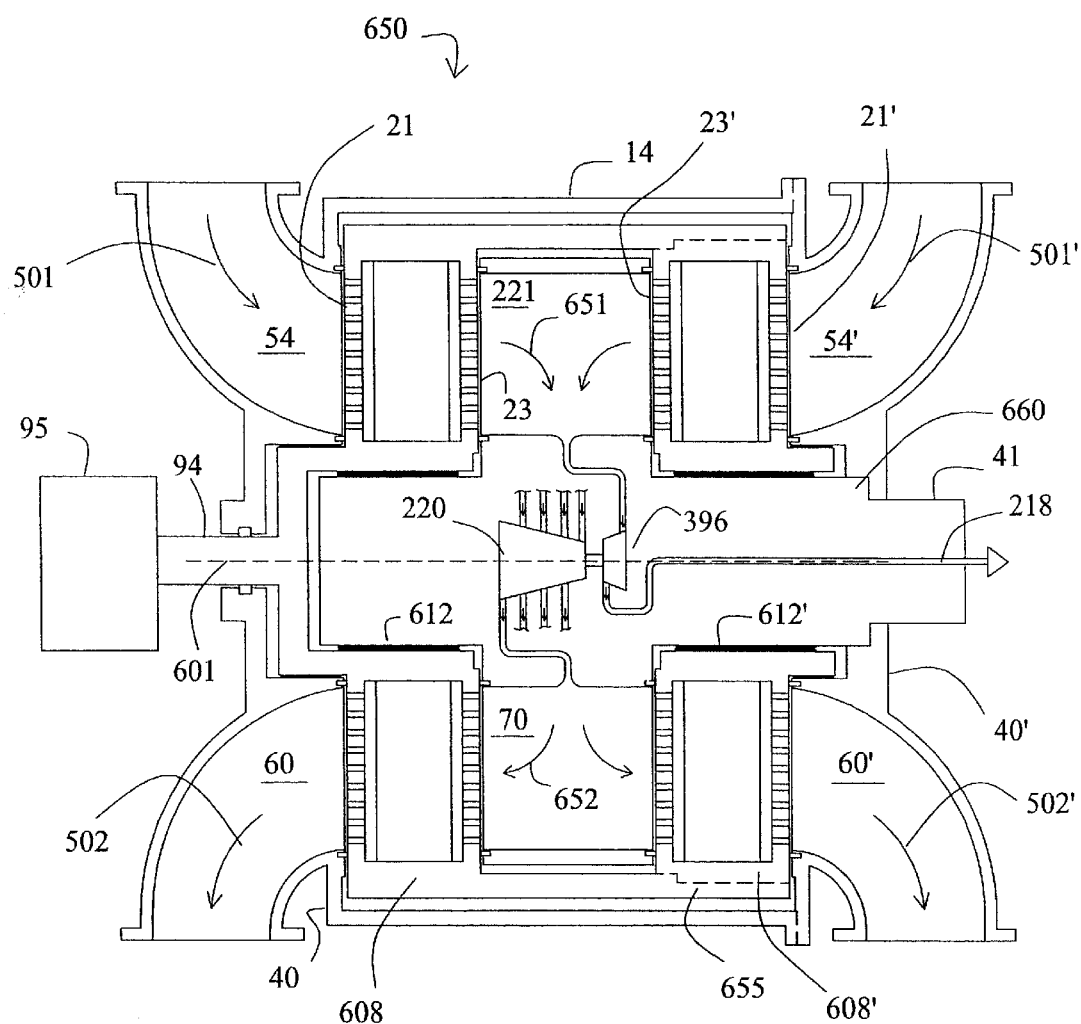
FIG. 20 shows a double axial flow rotary PSA module.

FIG. 20 shows an axial flow rotary PSA module 650 with twin adsorber wheels. The same reference numerals are used as in FIG. 19 for the first adsorber wheel 608, and primed reference numerals are used for the second adsorber wheel 608', which are assembled together as rotor 11. Module 650 has two first valve faces 21 and 21', each with a full set of feed supply and second product exhaust compartments. External manifolds will be provided to supply feed fluid to each pair of feed compartments and to withdraw exhaust fluid from each pair of exhaust compartments. Module 650 has two second valve faces 23 and 219', which share a common set of compartments for light product delivery, light reflux exit and return, and purge. Arrows 651 indicate the flow direction in compartment 221, and arrows 652 indicate the flow direction in compartment 70.

Rotor 11 is driven by shaft 94 coupled to the first adsorber wheel 608. The adsorber wheels 408 and 608' are attached at joint 655. Flanged cover plate 615 of FIG. 19 is here replaced by the first valve stator 40' for the second adsorber wheel 608', in the role of connecting the first valve stator 40 and second valve stator 41 to form an enclosed housing for the module. A small diameter dynamic seal 660 is mounted adjacent bushing 612', to prevent leakage between the first and second valve faces.

Embodiment 650 enables a doubled capacity rating for the twin axial wheel configuration compared to the single wheel embodiment 600.

FIG. 21

Figure 21:
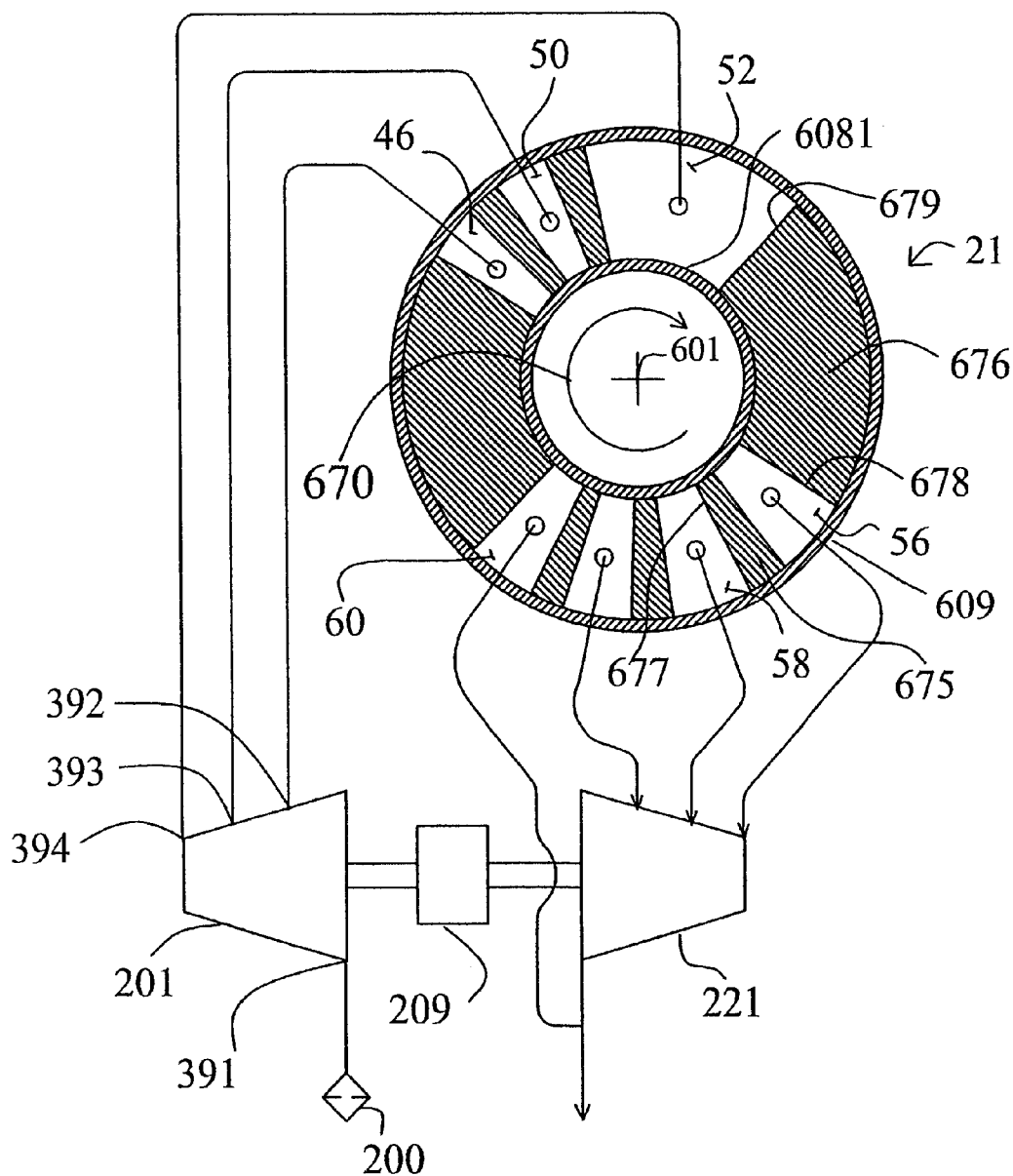
FIG. 21 shows the first valve face of the embodiment of FIG. 19.

FIG. 21 shows the first valve face 21 of embodiment 600 of FIG. 19, at section 602–603, with fluid connections to a split stream feed compressor 201 and a split stream countercurrent blowdown expander 221. Arrow 670 indicates the direction of rotation by adsorber rotor 11. The open area of valve face 21 ported to the feed and exhaust compartments is indicated by clear angular segments 46, 50, 52, 56, 58, 60 corresponding to those compartments, between circumferential seals 608 and 609. The closed area of valve face 21 between compartments is indicated by cross-hatched sectors 675 and 676. Typical closed sector 675 provides a transition for an adsorber, between being open to compartment 56 and open to compartment 58. Gradual opening is provided at the leading edges 677 and 678 of compartments, so as to achieve gentle pressure equalization of an adsorber being opened to a new compartment. Much wider closed sectors (e.g. 676) are provided to substantially close flow to or from one end of the adsorbers when pressurization or blowdown is being performed from the other end.

Sealing between compartments at typical closed sectors (e.g. 675) may be provided by rubbing seals on either stator or rotor against a ported hard-faced sealing counter face on the opposing rotor or stator, or by narrow gap clearance seals on the stator with the area of the narrow sealing gap defined by the cross hatched area of the nominally closed surface. Rubbing seals may be provided as radial strip seals, with a self-lubricating solid material such as suitable PTFE compounds or graphite, or as brush seals in which a tightly packed brush of compliant fibers rubs against the counter face.

If the rubbing seals are on the rotor (between adjacent adsorbers), cross-hatched sectors 675 and 676 would be non-ported portions of the hard-faced sealing counter face on the stator. If the rubbing seals are on the stator, the ported hard-faced counter face is on the rotor valve face. Those rubbing seals could be provided as full sector strips for narrow closed sectors (e.g. 675). For the wider closed sectors (e.g. 676), narrow radial rubbing seals may be used as the edges 678 and 679, and at intervals between those edges, to reduce friction in comparison with rubbing engagement across the full area of such wide sectors.

Clearance seals are attractive, especially for larger scale modules with a very large number "N" of adsorbers in parallel. The leakage discharge coefficient to or from the clearance gap varies according to the angular position of the adsorber, thus providing gentle pressure equalization as desired. The clearance gap geometry is optimized in typical nominally closed sectors (e.g. 675) so that the leakage in the clearance gap is mostly used for adsorber pressure equalization, thus minimizing through leakage between compartments. The clearance gap may be tapered in such sectors 675 to widen the gap toward compartments being opened, so that the rate of pressure change in pressure equalization is close to linear. For wide closed sectors (e.g. 676) the clearance gap would be relatively narrow as desired to minimize flows at that end of adsorbers passing through those sectors.

For all types of valve face seals described above, it is preferable that consistent performance be achieved over time, and that all "N" adsorbers experience the same flow pattern after all perturbations from seal imperfections. This consideration favours placing rubbing seals on the stator so that any imperfections are experienced similarly by all adsorbers. If the seals are mounted on the rotor between adsorbers, it is preferable that they are closely identical and highly reliable to avoid upsetting leakages between adjacent adsorbers.

To compensate for misalignment, thermal distortion, structural deflections and wear of seals and bearings, the sealing system should have a suitable self-aligning suspension. Thus, rubbing seal or clearance seal elements may be supported on elastomeric supports, bellows or diaphragms to provide the self-aligning suspension with static sealing behind the dynamic seal elements. Rubbing seals may be energized into sealing contact by a combination of elastic preload and gas pressure loading.

Clearance seals require extremely accurate gap control, which may be established by rubbing guides. Clearance seal gap control may also be achieved by a passive suspension in which the correct gap is maintained by a balance between gas pressure in the gap of a clearance seal segment, and the pressures of adjacent compartments loading the suspension behind that segment. For seal elements between blowdown compartments, a simple passive self-adjusting suspension should be stable. Active control elements could also be used to adjust the clearance seal gap, with feedback from direct gap height measurement or from the pressure gradient in the gap. Active control may be considered for seal elements between pressurization compartments, for which the simple passive control may be unstable.

FIG. 22

Figure 22:
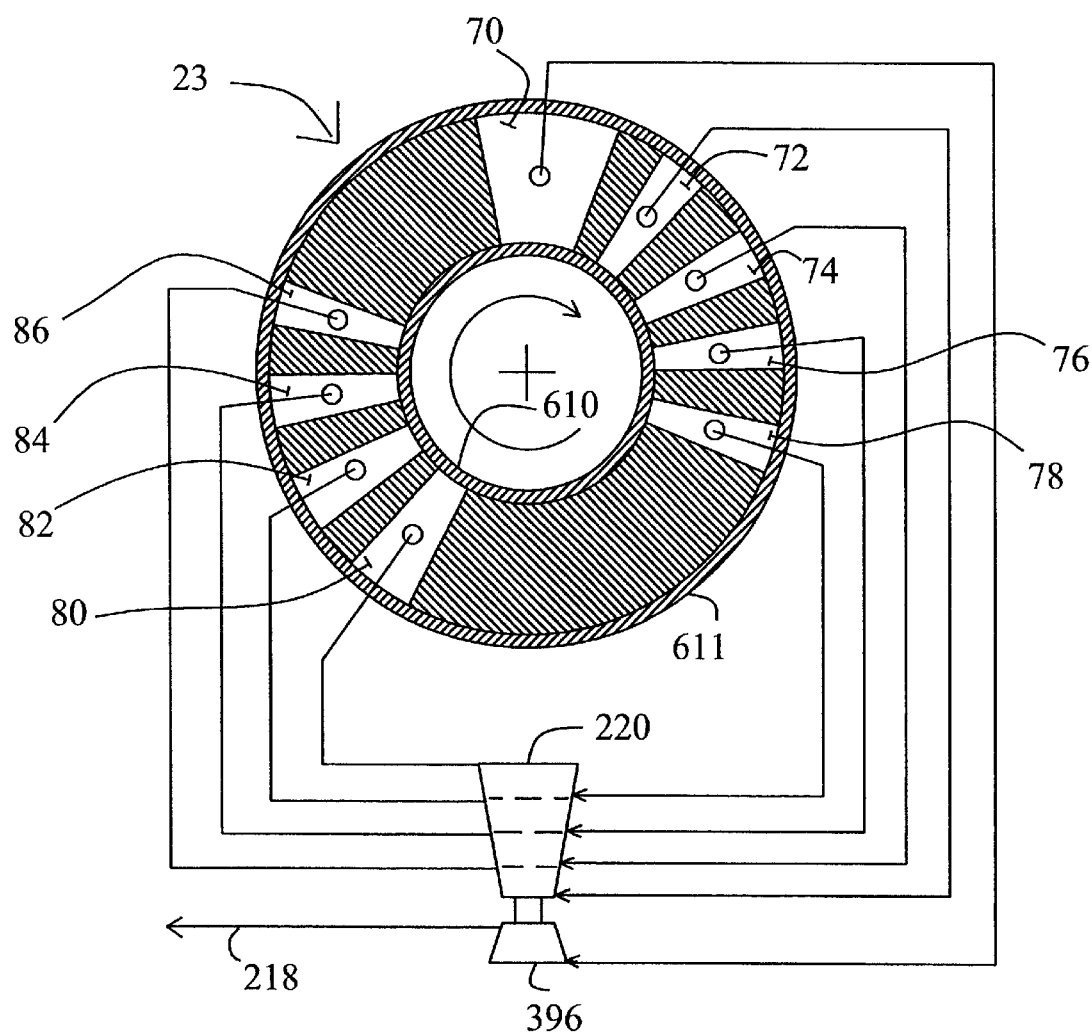
FIG. 22 shows the second valve face of the embodiment of FIG. 19.

FIG. 22 shows the second valve face 23 of embodiment 600 of FIG. 19, at section 604–605, with fluid connections to a split stream light reflux expander 220 and light product booster compressor 396. Fluid sealing principles and alternatives are similar to those of FIG. 21. Similar principles and alternatives apply to radial flow and axial flow geometries, respectively sealing on cylindrical or disc faces.

FIG. 23

Figure 23:
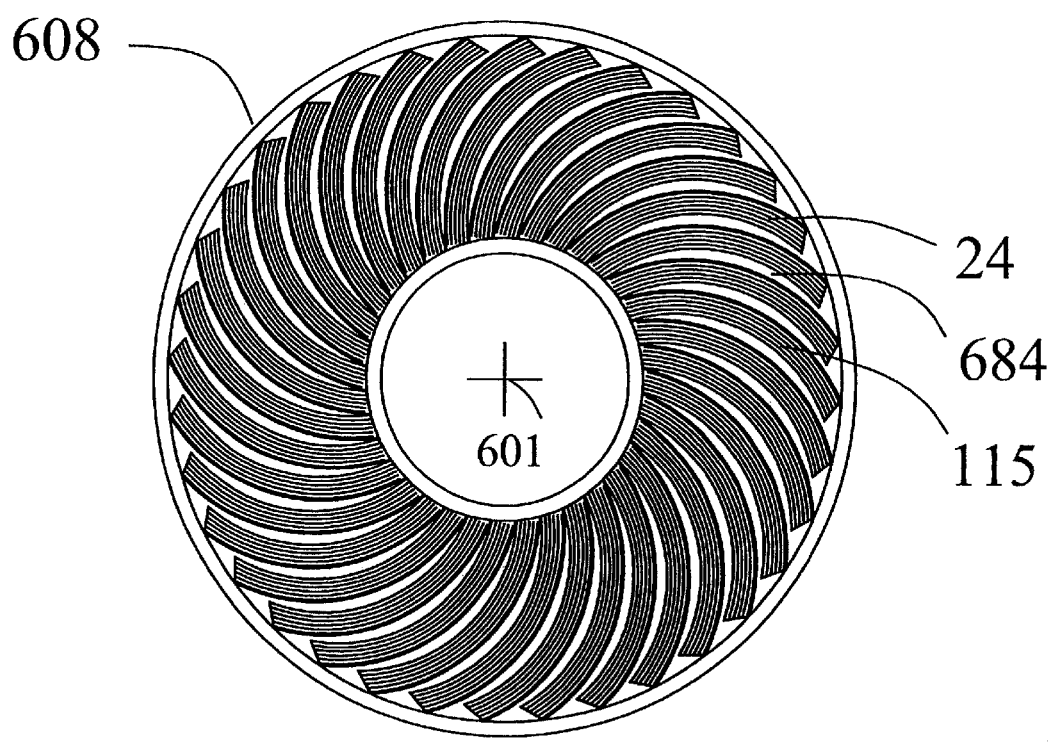
FIG. 23 shows an adsorber wheel configurations based on laminated adsorbent sheet adsorbers for the embodiment of FIG. 19.

Adsorber wheel 608 may use radially aligned rectangular flat packs of adsorbent laminate, as shown in FIG. 5 for radial flow. FIG. 23 shows an alternative adsorber wheel configuration for the embodiment of FIG. 19, at section 606–607. As in FIG. 5, the adsorbers 24 are again formed of a pack of rectangular adsorbent sheets with spacers, but with the sheets here curved arcs rather than flat. With this configuration, the ports and seals in valve faces 21 and 23 would desirably be configured as corresponding curved arcs. Voids between the circularly curved adsorber packs are filled by separators 684. Such circularly curved adsorber packs may be made by forming the adsorbent sheets with spacers in a spiral roll on a circular cylindrical mandrel, and then cutting the spiral roll longitudinally to obtain the desired packs. Packing density may be further improved by forming the adsorber sheets to a spiral rather than circular curve.

FIGS. 24–27

Figure 24:
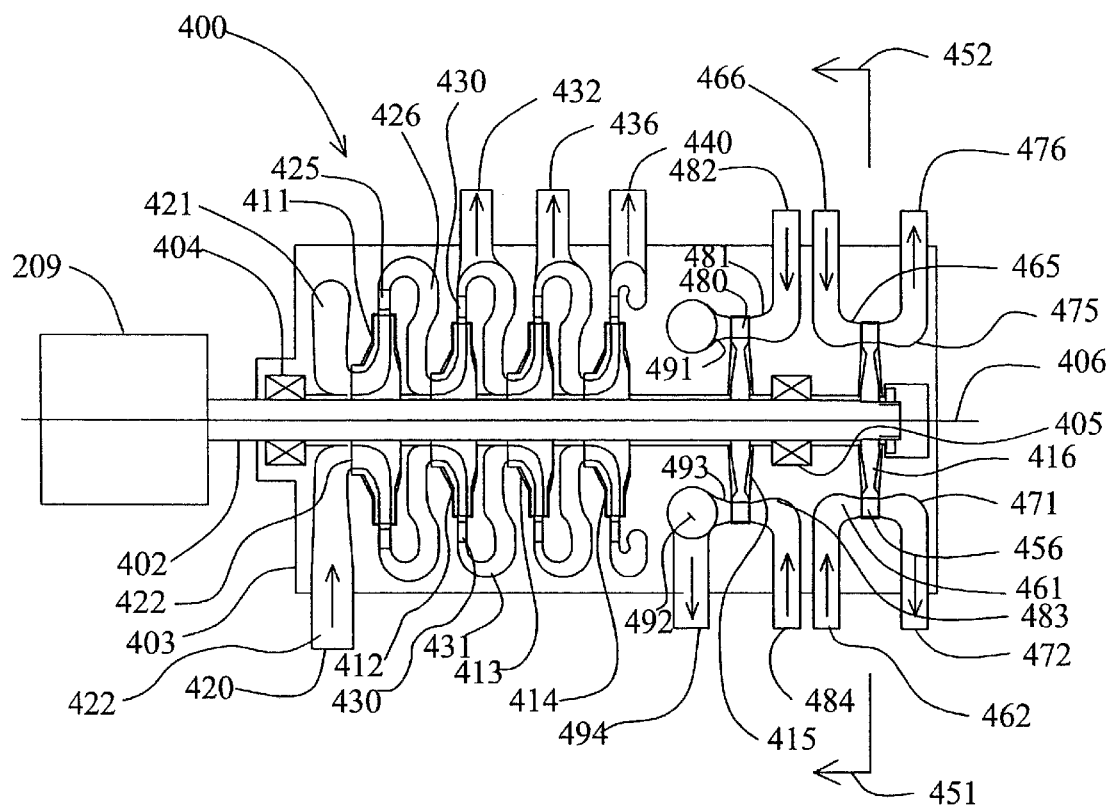
FIG. 24 shows a multistage centrifugal compressor with impulse turbine expanders for the light reflux and countercurrent blowdown.

FIG. 24 shows a multistage centrifugal compressor 400 with impulse turbine expanders for the light reflux and countercurrent blowdown, configured to provide the feed compressor stages 202, 204, 206 and 208, the countercurrent blowdown expander stages 242 and 245, and the light reflux expander stages 226, 230, 234, and 238 of FIG. 8. Prime mover 209 drives shaft 402, supported in compressor casing 403 by bearings 404 and 405 on axis 406. Shaft 402 carries compressor first stage impeller 411, second stage impeller 412, third stage impeller 413 and fourth stage impeller 414, exhaust impulse turbine runner 415 and light reflux impulse turbine runner 416.

Feed air from PSA plant inlet 200 enters suction port 420 to suction scroll 421 to the inlet 422 of impeller 411. Impeller 411 discharges the air to first stage diffuser 425 and first stage collector scroll 426, which directs the first stage compressed air to the inlet of the second stage impeller 412. Impeller 412 discharges the air to second stage diffuser 430 and second stage collector scroll 431, from which second stage delivery port 432 discharges a portion of the feed air as pressurization gas at the second stage pressure to conduit 212. Similarly, the feed air is compressed by the third and fourth stage impellers 413 and 414, discharging air at the third stage pressure from third stage delivery port 436 communicating to conduit 214, and at the fourth stage pressure from fourth stage delivery port 440.

The multistage centrifugal compressor 400 provides the stages of feed compressor 201 in FIG. 8. Multistage vacuum pumps, as required in the embodiment of FIG. 9, may similarly be provided as conventional centrifugal stages. For a large multiple module plant, for example as described in FIG. 16, the exhaust and light reflux expander turbines may be provided as multistage radial inflow turbines whose stages would be mechanically similar to the centrifugal stages of FIG. 24. In larger plants, expander stages may also be provided full admission axial turbine stages, similar to gas turbine stages.

For particular advantage in smaller plant capacities, considerable simplification is obtained in the embodiment of FIGS. 24–27 by using partial admission impulse turbines for countercurrent blowdown and light reflux expansion, with each expander stage occupying a sectorial arc of the corresponding turbine on a single runner wheel. This approach is practicable because the stages for each turbine expand gases of approximately similar composition across adjacent pressure intervals.

Figure 25:
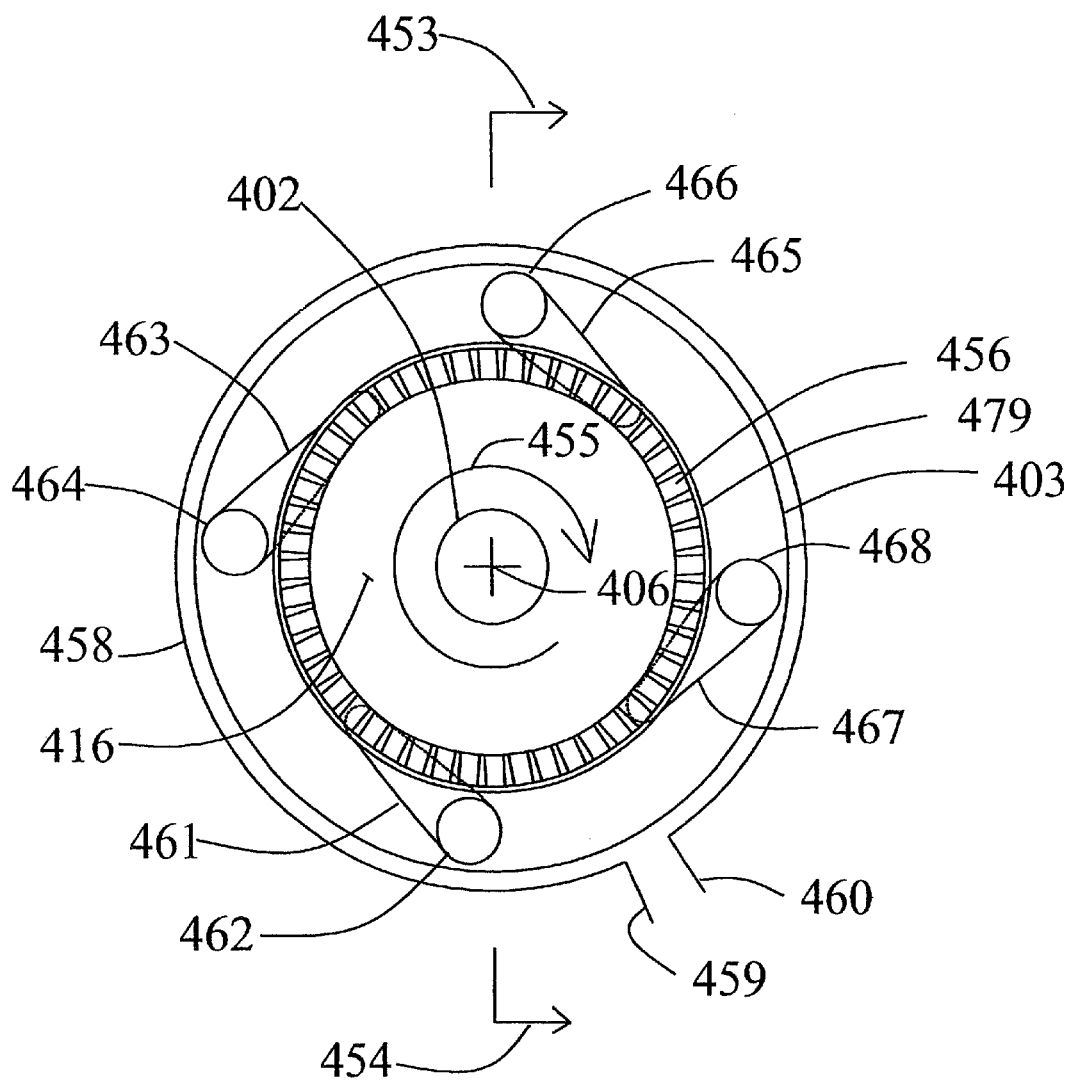
FIG. 25 shows the light reflux impulse turbine runner with four nozzles.
Figure 26:
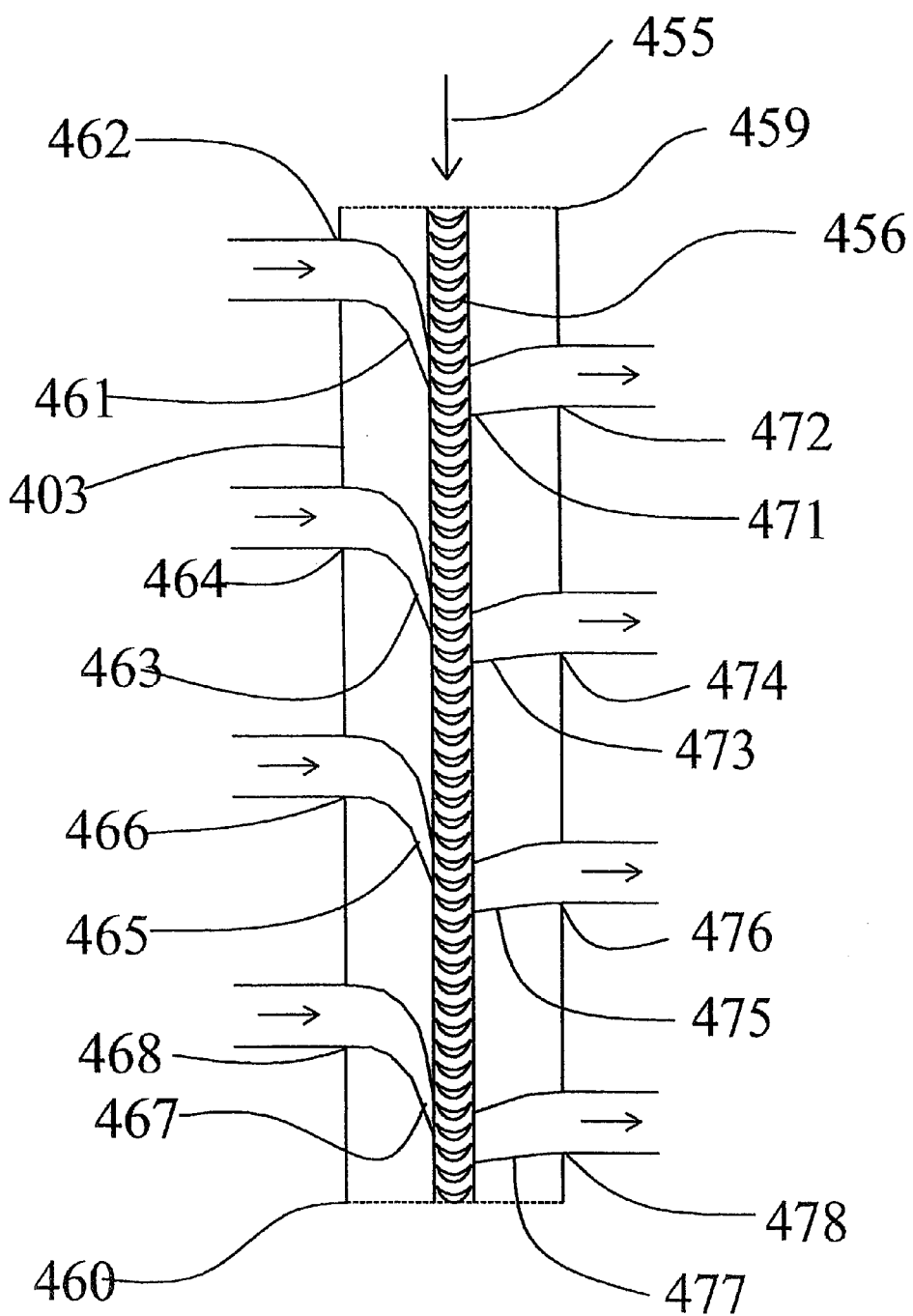
FIG. 26 is an unrolled view of the light reflux expander impulse turbine.

FIG. 25 is a section of FIG. 24, defined by arrows 451 and 452, across the plane of light reflux impulse turbine runner 416. FIG. 24 is a section of FIG. 25, in the plane indicated by arrows 453 and 454. Runner 416 rotates about axis 406 in the direction indicated by arrow 455. Runner 416 has blades 456 mounted on its rim. FIG. 26 is a projected view of the light reflux expander impulse turbine, unrolled around 360° of the perimeter of the impulse turbine as indicated by the broken circle 458 with ends 459 and 460 in FIG. 25.

The light reflux turbine has four nozzles serving the four 900 quadrants of the runner to provide the four expansion stages, including first nozzle 461 receiving flow from port 462 communicating to conduit 224, second nozzle 463 receiving flow from port 464 communicating to conduit 228, third nozzle 465 receiving flow from port 466 communicating to conduit 232, and fourth nozzle 467 receiving flow from port 468 communicating to conduit 236.

The first stage light reflux flow from nozzle 461 impinges blades 456, and is collected in diffuser 471 and discharged at the reduced pressure by port 472 communicating to conduit 227. Similarly the light reflux flow from nozzle 463 is collected in diffuser 473 and flows by port 474 to conduit 231, the light reflux flow from nozzle 465 is collected in diffuser 475 and flows by port 476 to conduit 235, and the light reflux flow from nozzle 467 is collected in diffuser 477 and flows by port 478 to conduit 239. To minimize interstage leakage losses, the channel gap 479 between the casing 403 and blades 456 of runner 416 is appropriately narrow between quadrants.

Figure 27:
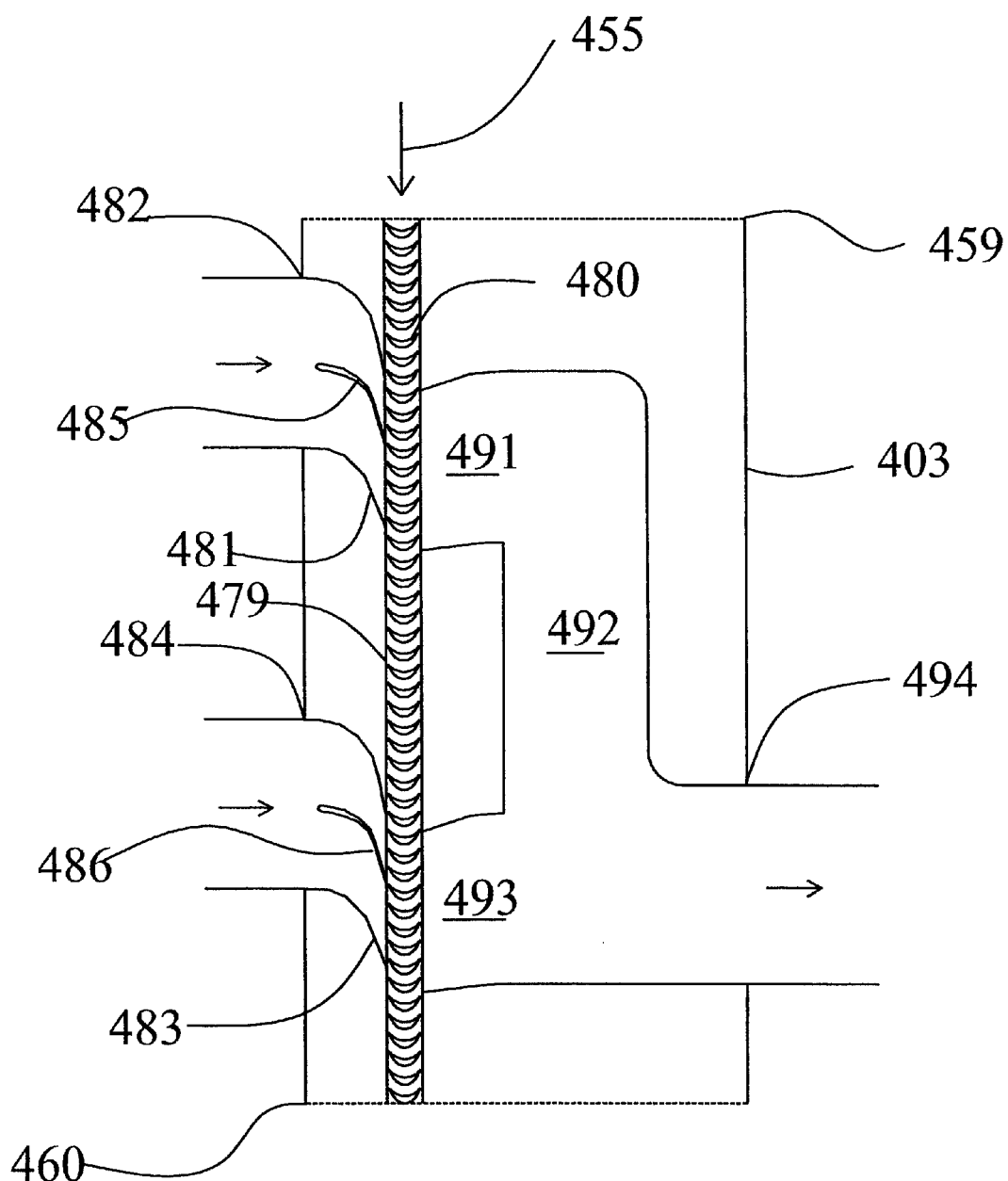
FIG. 27 is an unrolled view of the countercurrent blowdown expander impulse turbine.

The exhaust expander turbine, or countercurrent blowdown expander turbine, has two stages. Its sectional arrangement is similar to that depicted in FIG. 25, except that two rather than four nozzles and diffusers are required for the two exhaust stages. FIG. 27 is an unrolled projection around exhaust turbine runner 415 as indicated by broken circle 458 for the light reflux turbine. The exhaust turbine has impulse blades 480 on runner 415. Nozzle 481 receives the first countercurrent blowdown stream by port 482 communicating to conduit 240, while nozzle 483 receives the second countercurrent blowdown stream by port 484 communicating to conduit 244. Nozzles 481 and 483 have guide vanes 485 and 486, and direct the countercurrent blowdown flows to impinge on blades 480 in opposite half sectors of the turbine 415. After deflection by blades 480, the expanded flow from nozzle 481 is collected in diffuser 491, and is passed to collector ring manifold 492. The flow from nozzle 483 likewise passes the blades 480 and is collected in diffuser 493 joining manifold 492 to deliver the combined low pressure exhaust flow by exhaust port 494 which is connected to the discharge 243.

FIG. 28

Figure 28:
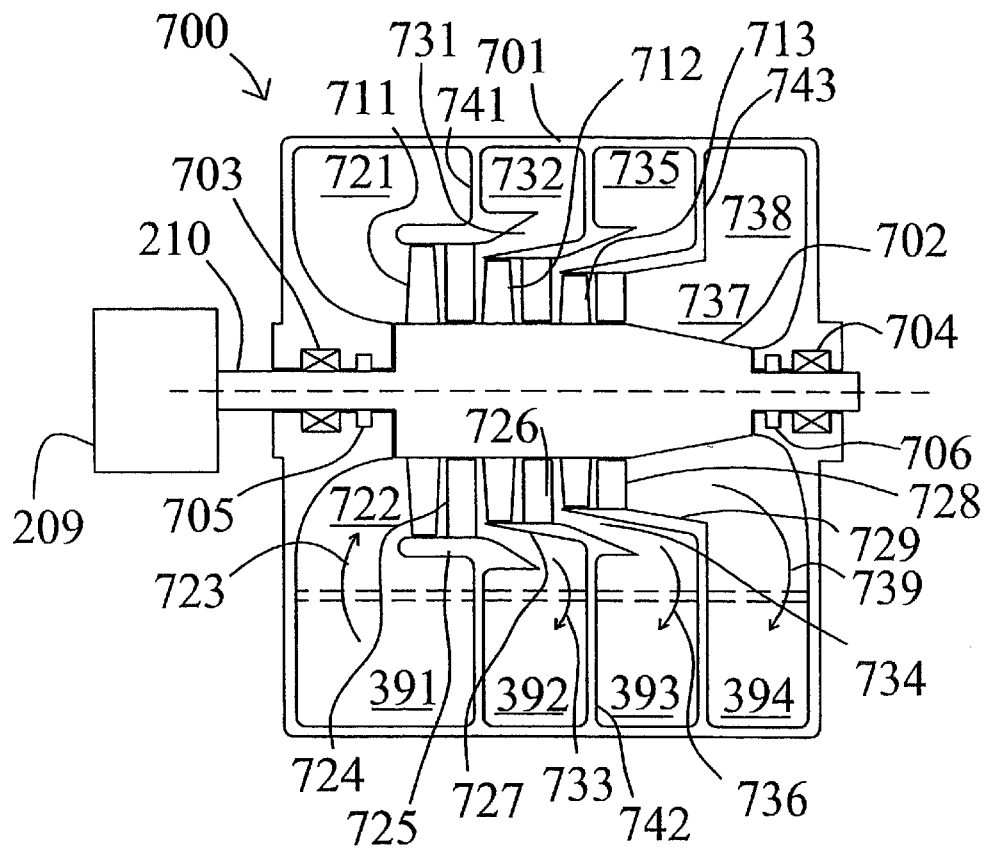
FIG. 28 shows a split stream axial compressor with three stages.

FIG. 28 shows a three stage axial flow split stream compressor 700. While it is known in the prior art to divert minor bleed flows between stages of multistage axial flow compressors or expanders, compressor 700 has nested annular diffusers for splitting fractionally large intermediate flows from the main flow between stages.

Compressor 700 may represent split stream compressor 201 of FIG. 4, and has a scroll housing 701 with feed inlet 391, first discharge port 392, second discharge port 393 and third discharge port 394. Rotor 702 is supported by bearings 703 and 704 with shaft seals 705 and 706 within housing 701, and is driven by motor 209 through shaft 210. The rotor supports first stage rotor blades 711, second stage rotor blades 712, and third stage rotor blades 713.

Housing 701 includes an inlet scroll 721 distributing feed gas from inlet 391 to annular feed plenum 722, with the flow direction indicated by arrow 723. The feed flow enthalpy is increased by first stage blades 711, with static pressure recovery by first stage stator blades 724 mounted in first stage stator ring 725. The feed flow enthalpy is further increased by second stage blades 712, with static pressure recovery by second stage stator blades 726 mounted in second stage stator ring 727; and finally by third stage blades 713, with static pressure recovery by third stage stator blades 728 mounted in third stage stator ring 729.

Second stage stator ring 727 has a smaller diameter than first stage stator ring 725, defining an annular area of annular first stage diffuser 731 which delivers the first intermediate feed pressurization flow to collector scroll 732 and thence to first discharge port 392 as indicated by arrow 733. Similarly, third stage stator ring 729 has a smaller diameter than second stage stator ring 727, defining an annular area of annular second stage diffuser 734 which delivers the first intermediate feed pressurization flow to collector scroll 735 and thence to second discharge port 393 as indicated by arrow 736. The fraction of flow entering the first and second stage annular diffusers is substantially equal to the ratio of the annular area of those diffuser inlets to the annular flow area of that stage between its stator ring and the rotor 702.

The flow delivered by the third stage passes stator blades 728 into third stage diffuser 737, and in collector scroll 738 into discharge port 394 as indicated by arrow 739. Stator rings 725, 727 and 729 are respectively supported by partitions 741, 742 and 743 separating the inlet and discharge scrolls.

It will be evident that additional stages could be added with more paired sets of rotor blades and stator blades, with the option of including or not including an annular diffuser for diverting an intermediate flow stream between any adjacent pair of stages. It will also be evident that the structure of compressor 700 could be applied to a split stream axial flow vacuum exhauster or expander, by reversing the flow directions indicated by arrows 723, 733, 736, and 739, so that port 394 would be a first inlet, port 393 a second inlet, and port 392 a third inlet for each of three inlet streams at incremental total pressures, and with port 391 the discharge port for the combined total flow.

FIG. 29

Figure 29:
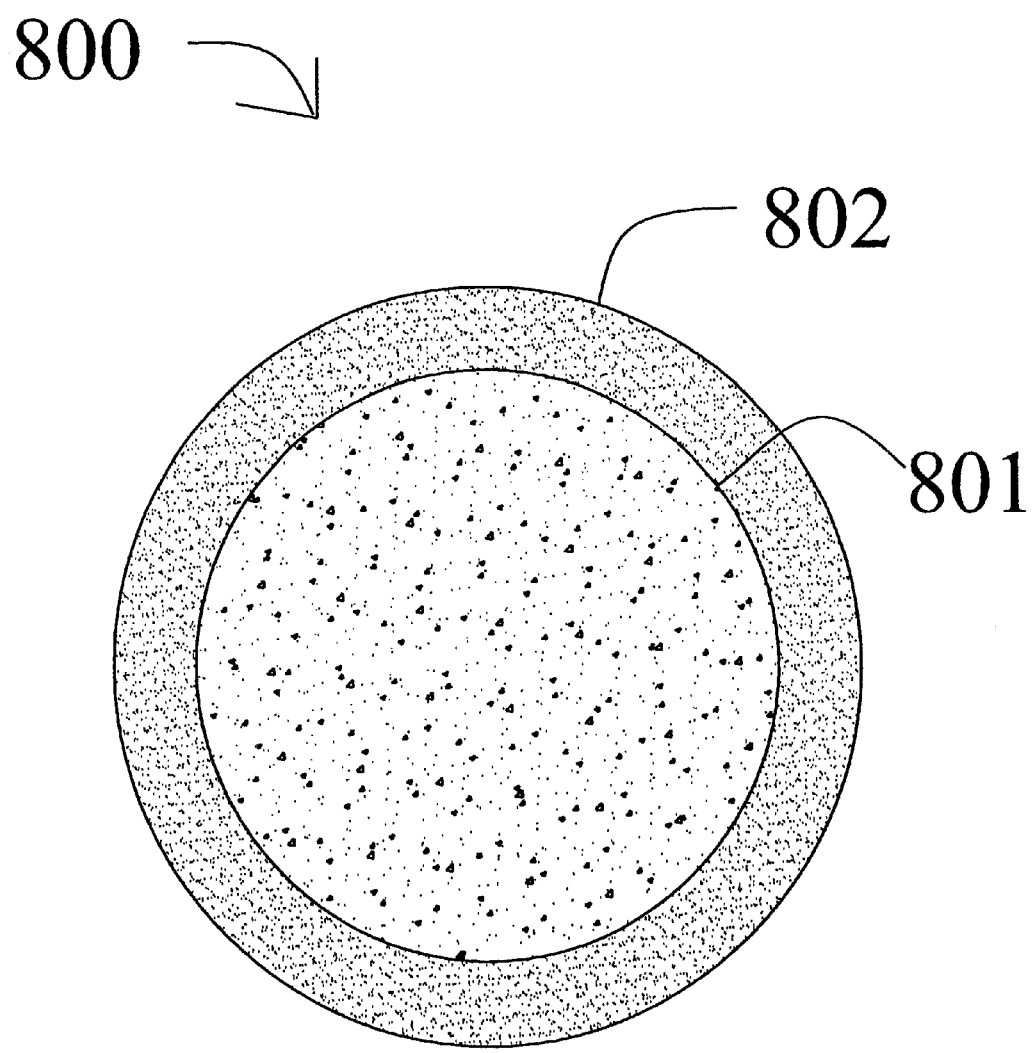
FIG. 29 shows a composite pellet with zeolite material coated on a high specific gravity inert core, for centrifugally stabilized granular adsorbers in radial flow embodiments.

FIG. 29 shows a composite adsorbent pellet 800, useful in the practice of the present invention with the radial flow configuration of FIGS. 4, 5, 6 and 18, in the alternative of using granular packed bed adsorbers 24.

Granular adsorbent beds cannot be operated in prior art PSA devices at very high cycle frequency without excessive pressure drops leading to incipient fluidization and resulting attrition. The present apparatus in the radial flow configuration provides a centripetal acceleration field which may be greater than the ordinary gravitational field. This provides a desirable "centrifugal clamping" effect to stabilize the adsorbent bed, and thus facilitate safe operation at higher cycle frequency. However, the specific gravity of conventional macroporous zeolite adsorbent pellets is only about 0.75, thus limiting the effect of centrifugal clamping. While the use of rotating granular adsorbent beds in radial flow configurations is well known in the above cited prior art, operating conditions that would provide useful centrifugal clamping have not been disclosed. Thus, Boudet et al in U.S. Pat. No. 5,133,784 contemplate a maximum cycle frequency and rotor speed of 20 RPM, which with their mentioned rotor outer radius of 1 meter would provide a maximum centripetal acceleration of less than half the acceleration of gravity at the outer radius. The adsorbent beds, within the rotor and closer to the axis, are subject to a much smaller centripetal acceleration.

Ballasted composite pellet 800 has an inert core 801 of a dense material, surrounded by a coating 802 of macroporous zeolite material similar to the material of conventional adsorbent pellets. The core material may be selected for high density, high heat capacity, high thermal conductivity and compatibility for adhesion to zeolite binders as well as for thermal expansion. Suitable core materials include transition metal oxides, most simply iron oxide, as well as solid iron or nickel-iron alloys.

If the diameter of core 801 is e.g. 790 microns, and the radial thickness of coating 802 is e.g. 105 microns so that the overall diameter of a spherical pellet 800 is 1 mm, the volume of the pellet is then 50% inert and 50% active macroporous adsorbent. In a packed bed using such composite pellets, the active volume of adsorbent has been reduced by 50%, while the fractional bed voidage of the active material has been increased from the typical 35% of spherical granular media to approximately 50%. This might seem to be an inferior packed bed, with half as much useful material and reduced effective selectivity performance because of the high effective void fraction. Unexpectedly, this can be a superior packed bed, because pressure drop and mass transfer resistance are both reduced. so that the PSA cycle can be operates at higher cycle frequency without excessive pressure drop and without risk of fluidization. At the same cycle frequency, pressure drops are reduced by the smaller flows in proportion to the smaller active adsorbent inventory for the same voidage channels, while mass transfer through the macropores only has to take place through a relatively thin shell. The inert material also acts as thermal ballast to isothernalize the adsorber against thermal swings due to heat of adsorption.

While the higher void fraction will reduce product yield at specified purity in the uneconomic regime of very low cycle frequency, product yield and productivity are actually enhanced in the economic regime of higher cycle frequency. Degradations of product yield and process energy efficiency (at specified product purity) will result from mass transfer resistance and pressure drop, and those degradations are more severe for the conventional bed than for the present inventive granular adsorber of composite pellets.

Such composite pellets are very useful in the radial flow embodiment of the rotary adsorber module, since the heavy composite pellets are centrifugally stabilized very positively, even as mass transfer resistance and pressure drop are reduced. Such composite pellets will also be very useful in axial flow embodiments, as well as non-rotary adsorbers, with vertically oriented flow path. Again, cycle frequency can be increased, while performance can be enhanced in terms of productivity, yield and efficiency at the most economic operating point. Consider FIGS. 4 and 18 to be vertical views of radial flow embodiments. The vertical axis embodiment of FIG. 4 will benefit from centrifugal stabilization if its rotor radius and cycle frequency are high enough. The horizontal axis embodiment of FIG. 18 will have centripetal acceleration assisting the gravitational field to suppress fluidization in the feed production step with upward flow from compartment 54 to compartment 70 at higher pressure, while the centripetal acceleration will assist pressure drop in the purge step with upward flow from compartment 80 to compartment 60 at lower pressure to prevent downward collapse of the adsorbers at the top of their rotational orbit. The adsorbent beds are supported at their first end (radially outside) by a first set of screens, and retained against collapsing when the rotor is stopped by a second set of screens at their second end (radially inside). Hence, the adsorbent beds are centrifugally clamped on the first screens by centripetal acceleration with the rotor acting as a centrifuge.

While composite pellets 800 are shown in FIG. 29 as spherical, other geometries are also attractive. For example, cylindrical composite pellets might be made by dip-coating the zeolite and binder slurry onto steel rods, which are then cut into short lengths.

The centrifugal clamping aspect of the present invention allows operation of granular adsorbent beds with much higher than conventional flow friction pressure gradients while still positively preventing any particle movement and attrition. In turn, this allows use of smaller adsorbent gram sizes, also enabling a very shallow radial bed depth which reduces total pressure drop. With the small adsorbent granule size reducing the mass transfer diffusional resistance, high PSA cycle frequencies become practicable. Closing the logical argument, high cycle frequencies correspond to the high rotational speed needed for centrifugal clamping.

The foregoing description of the preferred embodiments of the invention is intended to be illustrative of the present invention. Those of ordinary skill will be able to make certain additions, deletions or modifications to the described embodiments which although not explicitly diclosed herein, do no depart from the spirit or scope of the invention as defined by the appended claims.

We claim:

1. A rotary module for implementing a pressure swing adsorption process having an operating pressure cycling between an upper pressure and a lower pressure for extracting a first gas fraction and a second gas fraction from a gas mixture including the first and second fractions, the rotary module comprising:

a stator including a first stator valve surface, a second stator valve surface, a plurality of first function compartments opening into the first stator valve surface, and a plurality of second function compartments opening into the second stator valve surface; and a rotor rotatably coupled to the stator and including a first rotor valve surface in communication with the first stator valve surface, a second rotor valve surface in communication with the second stator valve surface, a plurality of flow paths for receiving adsorbent material therein, each said flow path including a pair of opposite ends, and a plurality of apertures provided in the rotor valve surfaces and in communication with the flow path ends and the function compartments for cyclically exposing each said flow path to a plurality of discrete pressure levels between the upper and lower pressures to provide substantially uniform gas flow through the first and second function compartments;

wherein the second function compartments include a plurality of cocurrent blowdown compartments for subjecting the flow paths to a plurality of incremental pressure drops, and a plurality of light reflux return compartments communicating with the cocurrent blowdown compartments for subjecting the flow paths to a plurality of incremental pressure increases, and the stator includes pressure let-down means coupled between the cocurrent blowdown compartments and the light reflux return compartments for delivering gas removed from the cocurrent blowdown compartments at reduced pressure to the light reflux return compartments.

2. The rotary module according to claim 1, wherein the pressure let-down means comprises one of mechanical expansion stages, restrictor orifices and throttle valves.

3. The rotary module according to claim 1, wherein the second function compartments include a light product compartment, and the pressure letdown means comprises an expander coupled to the cocurrent blowdown compartments and the light reflux return compartments, and a compressor coupled to the light product compartment and to the expander for boosting light product gas pressure.

4. A rotary module for implementing a pressure swing adsorption process having an operating pressure cycling between an upper pressure and a lower pressure for extracting a first gas fraction and a second gas fraction from a gas mixture including the first and second fractions, the rotary module comprising:

a stator including a first stator valve surface, a second stator valve surface, a plurality of first function compartments opening into the first stator valve surface, and a plurality of second function compartments opening into the second stator valve surface; and a rotor rotatably coupled to the stator and including a first rotor valve surface in communication with the first stator valve surface, a second rotor valve surface in communication with the second stator valve surface, a plurality of flow paths for receiving adsorbent material therein, each said flow path including a pair of opposite ends, and a plurality of apertures provided in the rotor valve surfaces and in communication with the flow path ends and the function compartments for cyclically exposing each said flow path to a plurality of discrete pressure levels between the upper and lower pressures to provide substantially uniform gas flow through the first and second function compartments;

wherein the first function compartments include a plurality of countercurrent blowdown compartments for subjecting the flow paths to a plurality of incremental pressure drops, and a heavy reflux return compartment communicating with at least one of the countercurrent blowdown compartments, and the stator includes a reflux compressor coupled between the countercurrent blowdown compartments and the heavy reflux return compartment for delivery gas removed from the countercurrent blowdown compartments at increased pressure to the heavy reflux return compartments.

5. A rotor for implementing a pressure swing adsorption process, the rotor comprising:
an annular body including an inner valve surface and an outer valve surface;
a plurality of flow paths provided within the body and extending between the inner valve surface and the outer valve surface; and
a plurality of apertures provided in the valve surfaces in communication with the flow paths for allowing a gas flow through the flow paths, at least one of the valve surfaces being configured for maintaining the gas flow substantially uniform.

6. The rotor module according to claim 5 wherein an adsorbent bed is disposed within each of said flow path, and wherein each said adsorbent bed comprises at least two laminated adsorbent sheets, each said sheet including a reinforcement matrix, an adsorbent material deposited therein, a binder for securing the adsorbent material to the reinforcement matrix, and a spacer provided between the two laminated sheets for providing a flow channel therebetween.

7. The rotor module according to claim 6, wherein the reinforcement matrix is selected from glass fiber, metal wire matrix, metal foil, inorganic fiber and organic fiber.

8. The rotor module according to claim 6, wherein the adsorbent material comprises zeolite crystallites.

9. The rotor module according to claim 6, wherein the rotor has an inner circumference and an outer circumference, and the adsorbent beds have a width, the width being greater adjacent the outer circumference than adjacent the inner circumference and increasing in magnitude with distance from the inner circumference.

10. The rotor module according to claim 6, wherein the adsorbent beds have a curved shape.

11. The rotor module according to claim 6, wherein the adsorbent beds comprise a plurality of adsorbent pellets, each said pellet comprising an inert core coated with an adsorbent material.

12. The rotor module according to claim 11, wherein the inert core is selected from iron group metals and oxides thereof.

13. The rotor module according to claim 11, wherein the pellet has a volume, and the inert core comprises half of the volume.

14. The rotor module according to claim 5, wherein the flow paths include a pair of opposite ends, and each said aperture is disposed immediately adjacent to a respective one of the opposite ends.

15. A pressure swing adsorption system for extracting a first gas fraction and a second gas fraction from a gas mixture including the first and second fractions, the pressure swing adsorption system comprising:

a rotary module coupled to a gas feed manifold, a heavy product manifold, and a light product manifold, the rotary module comprising:
a stator including a first stator valve surface, a second stator valve surface, a plurality of first function compartments opening into the first stator valve surface, and a plurality of second function compartments opening into the second stator valve surface; and
a rotor rotatably coupled to the stator and including a first rotor valve surface in communication with the first stator valve surface, a second rotor valve surface in communication with the second stator valve surface, a plurality of flow paths for receiving adsorbent material therein, each said flow path including a pair of opposite ends, and a plurality of apertures provided in the rotor valve surfaces and in communication with the flow path ends and the function ports;
compression expansion machinery coupled to the rotary module for maintaining the function ports at a plurality of discrete pressure levels between an upper pressure and a lower pressure for providing substantially uniform gas flow through the flow paths;
wherein the function compartments include a plurality of gas feed compartments, and the compression/expansion machinery comprises a multi-stage compressor including a plurality of pressure output ports, each said pressure output port being coupled to a respective one of the feed compartments for delivering feed gas to the flow paths at a plurality of pressure increments; and
wherein the multi-stage compressor comprises a multi-stage axial flow split stream compressor including a plurality of annular stator rings of progressively decreasing diameter, each said stator ring including an annular flow area and a plurality of stator blades, and a rotor having an axis or rotation and including a plurality of rotor blades cooperating with the stator blades for compressing gas flow through the flow area, at least one of the said stator rings further including a collector and a diffuser for apportioning the compressed gas flow between the collector and the flow area of a subsequent one of the stator rings.

16. The pressure swing adsorption system according to claim 15, wherein the multistage compressor is coupled to a plurality of said rotary modules, and the gas feed manifold, the heavy product manifold, and the light product manifold are coupled to the plurality of rotary modules.

17. A multi-stage axial flow split stream compressor comprising:
a plurality of annular stator rings of progressively decreasing diameter, each said stator ring including an annular flow area and a plurality of stator blades; and
a rotor having an axis of rotation and including a plurality of rotor blades cooperating with the stator blades for compressing gas flow through the flow area, at least one of the stator rings further including a collector and a diffuser for apportioning the accelerated gas flow between the collector and the flow area of a subsequent one of the stator rings.

* * * * *

UNITED STATES PATENT AND TRADEMARK OFFICE
CERTIFICATE OF CORRECTION

PATENT NO.      : 6,451,095 B1
DATED           : September 17, 2002
INVENTOR(S)     : Keefer et al.

It is certified that error appears in the above-identified patent and that said Letters Patent is hereby corrected as shown below:

Title page,
Item [22], Filing Date, "Sep. 18, 2000", should be -- June 1, 2000 --.

Column 1,
Line 61, "purge. equalization." should be -- purge, equalization, --.

Column 2,
Line 54, "ends." should be -- ends, --.

Column 3,
Line 4, "absorber" should be -- adsorber --.

Column 4,
Line 44, "ecthalpy" should be -- enthalpy --.
Line 59, "o f" should be -- of --.

Column 5,
Line 14, "tall" should be -- tail --.

Column 8,
Line 37, "dispersion." should be -- dispersion, --.

Column 12,
Line 25, "transmitting" should be -- transiting --.

Column 14,
Line 2, "haters" should be -- heaters --.
Line 37 "superatmnospheric" should be -- superatmospheric --.

Column 15,
Line 43, "aid" should be -- and --.

Column 16,
Line 30, "35" should be -- 53 --.
Line 37, "pressurzation" should be -- pressurization --.

Column 18,
Line 9, "04" should be -- 204 --.

UNITED STATES PATENT AND TRADEMARK OFFICE
CERTIFICATE OF CORRECTION

PATENT NO. : 6,451,095 B1
DATED : September 17, 2002
INVENTOR(S) : Keefer et al.

It is certified that error appears in the above-identified patent and that said Letters Patent is hereby corrected as shown below:

Column 19,
Line 21, "115" should be -- 11 --.
Line 50, "f our" should be -- four --.

Column 24,
Line 47, "900" should be -- 90° --.

Column 26,
Line 60, "reduced." should be -- reduced, --.
Line 61, "operates" should be -- operated --.

Column 27,
Line 1, "isothernalize" should be -- isothermalize --.
Line 61, "do no depart" should be -- do not depart --.

Column 28,
Line 39, "let down" should be -- let-down --.

Column 30,
Line 46, "multi stage" should be -- multi-stage --.

Signed and Sealed this

Second Day of November, 2004

JON W. DUDAS
*Director of the United States Patent and Trademark Office*